(12) United States Patent
Yamada et al.

(10) Patent No.: US 6,619,324 B2
(45) Date of Patent: Sep. 16, 2003

(54) NON-RETURN BIAS VALVE MECHANISM FOR A FLUID PUMPING ASSEMBLY

(75) Inventors: Nagamasa Yamada, Fujisawa (JP); Kaoru Onizuka, Sakado (JP)

(73) Assignee: NGN Co., Ltd., Saitama (JP)

( * ) Notice: Subject to any disclaimer, the term of this patent is extended or adjusted under 35 U.S.C. 154(b) by 0 days.

(21) Appl. No.: 09/858,851

(22) Filed: May 15, 2001

(65) Prior Publication Data

US 2002/0039538 A1 Apr. 4, 2002

(30) Foreign Application Priority Data

| May 15, 2000 | (JP) | ................................... | 2000-142387 |
| Dec. 18, 2000 | (JP) | ................................... | 2000-384377 |
| Feb. 19, 2001 | (JP) | ................................... | 2001-041942 |

(51) Int. Cl.$^7$ ............................................. F16K 15/14
(52) U.S. Cl. .................................. 137/860; 137/512.15
(58) Field of Search ......................... 137/512.15, 860

(56) References Cited

U.S. PATENT DOCUMENTS

| 2,671,466 A | * | 3/1954 | Conrad | .................... 137/512.3 |
| 3,363,644 A | | 1/1968 | Malec | |
| 3,459,217 A | * | 8/1969 | Callahan | .................... 137/512.1 |
| 4,549,565 A | | 10/1985 | Short | |
| 5,762,103 A | * | 6/1998 | Gregoire | ................ 137/512.15 |

\* cited by examiner

Primary Examiner—Michael Powell Buiz
Assistant Examiner—Ramesh Krishnamurthy
(74) Attorney, Agent, or Firm—Leighton K. Chong; Ostrager Chong & Flaherty (Hawaii)

(57) ABSTRACT

A non-return bias valve mechanism for a fluid pumping assembly established to prevent backflow of fluid when the fluid is pumped under pressure, said mechanism comprises, a body member having a longitudinal hole 5a formed in the axis direction and radial hole(s) 5b extending from the longitudinal hole to a radial direction and going through to the outside, and, a ring shape sealing member 6 made of material having elasticity such as of rubber which is expandable that seals the radial hole(s) of the body member.

5 Claims, 24 Drawing Sheets

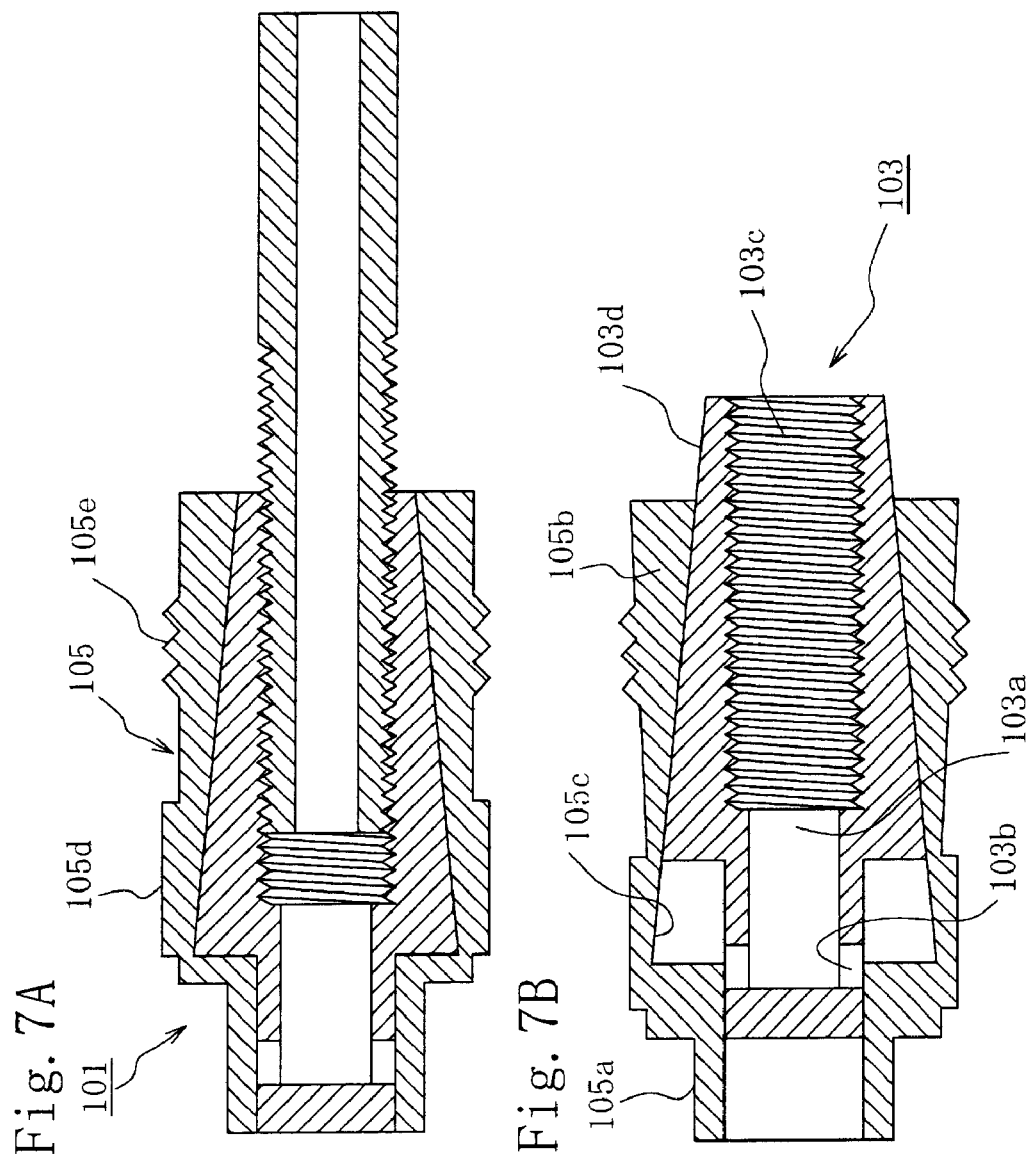

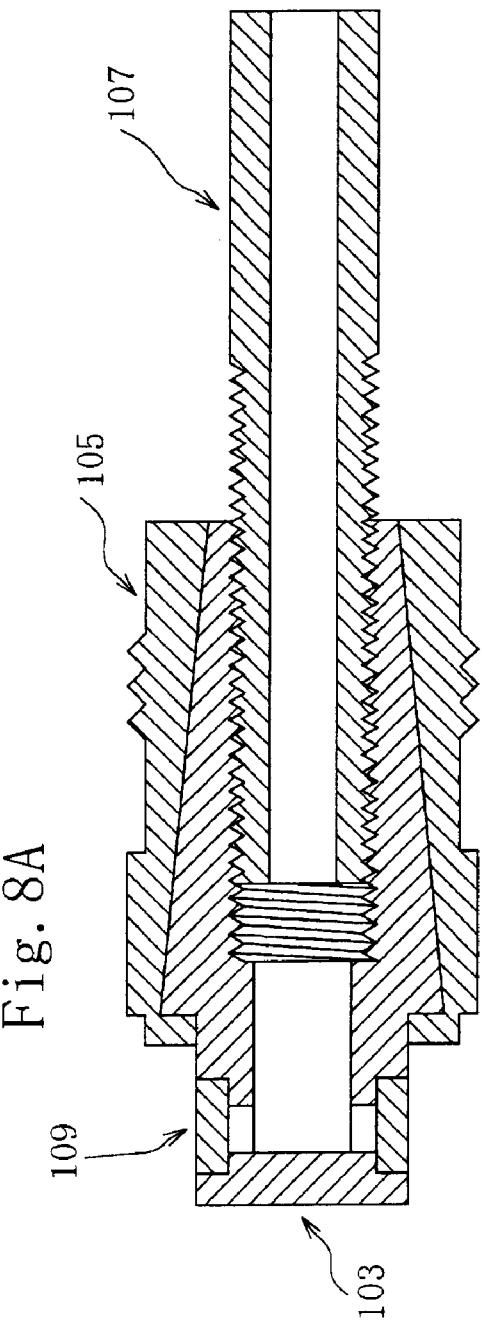
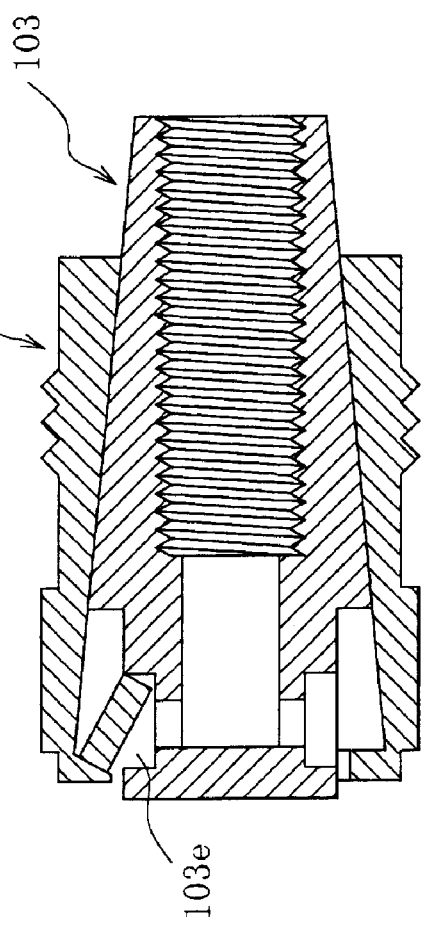

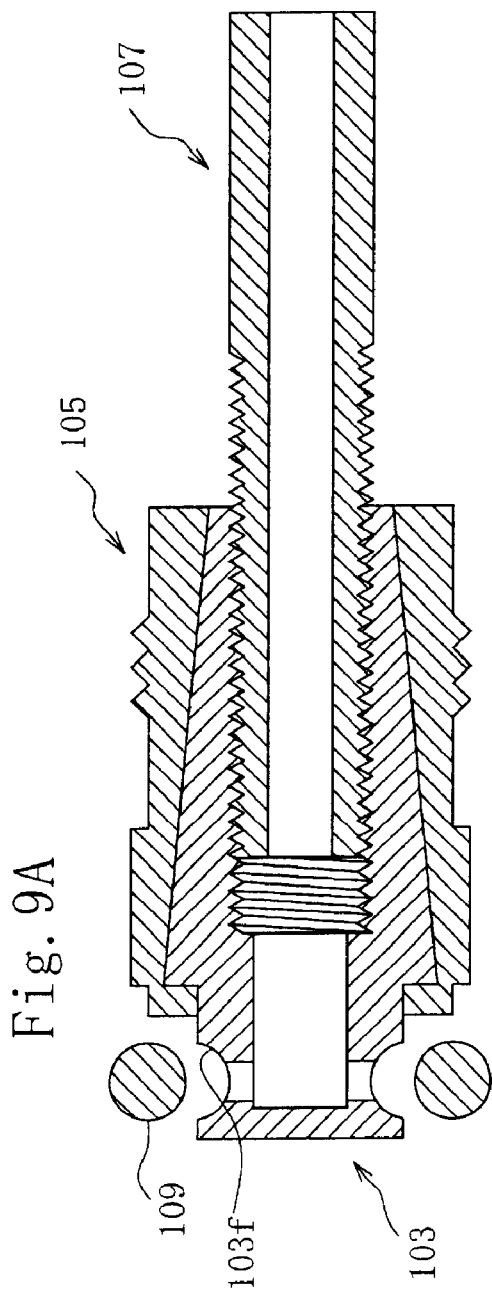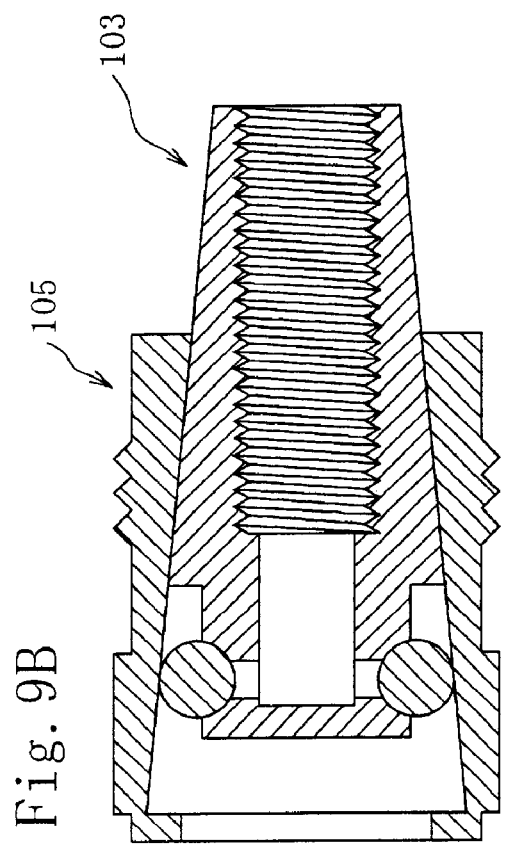

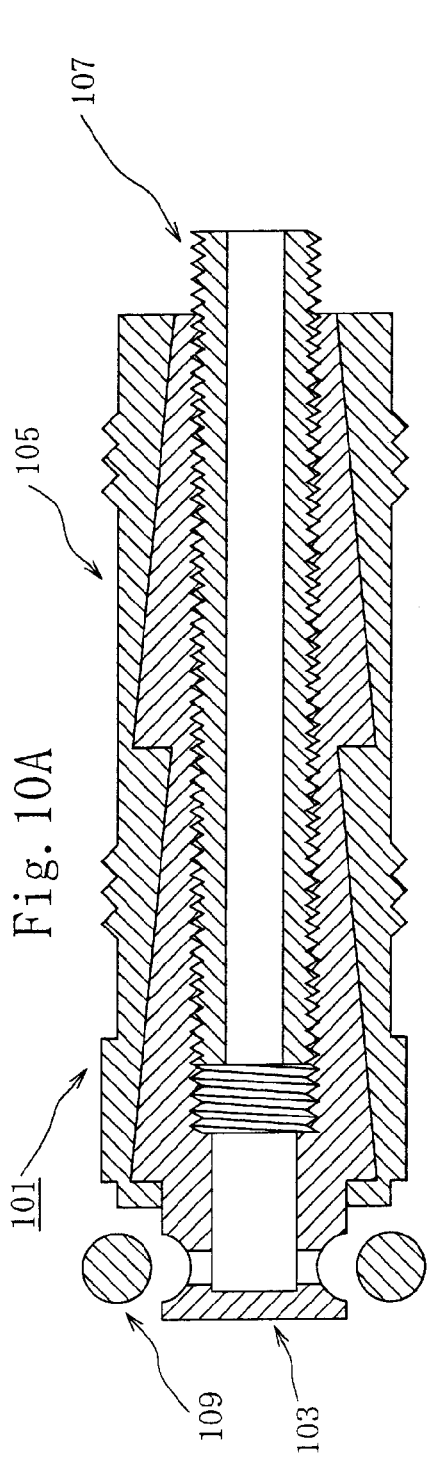
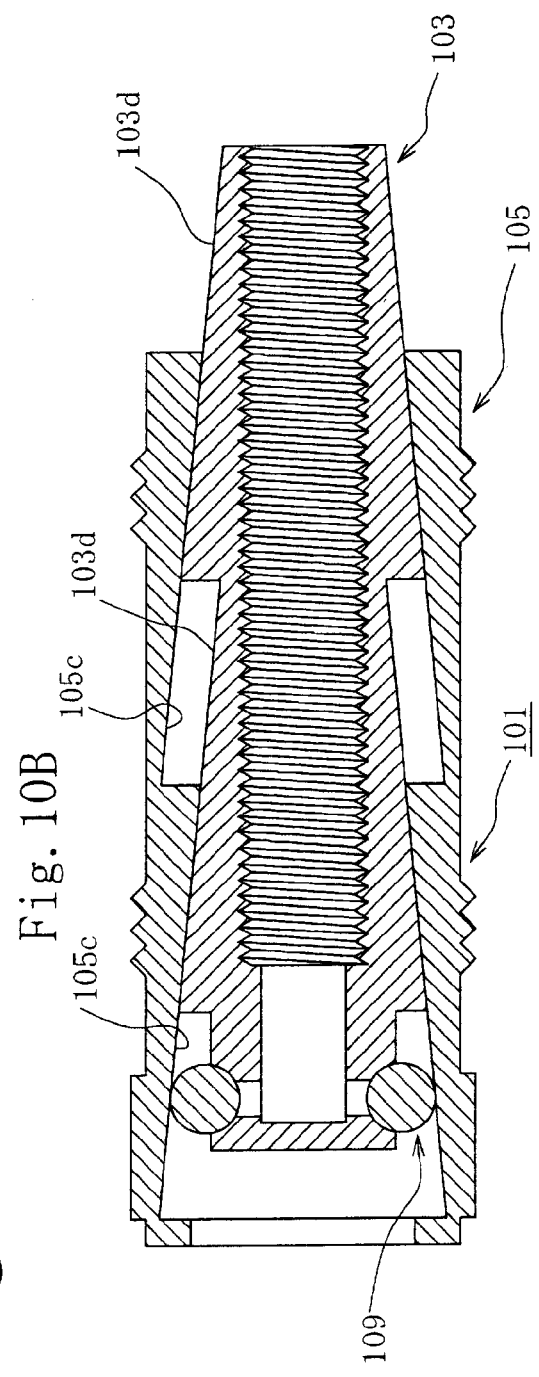

NON-RETURN BIAS VALVE MECHANISM FOR A FLUID PUMPING ASSEMBLY

BACKGROUND OF THE INVENTION

The first aspect of the present invention is that the invention is about a non-return bias valve mechanism for a fluid pumping assembly installed for preventing fluid from flowing backward when pumping fluid with pressure, and further, the invention is about a non-return bias valve mechanism for a fluid pumping assembly which may be produced in minimum number of parts and in low price.

The second aspect of the present invention is that the invention is about a chemical solution high pressure pumping plug used for repairs of cracks occurred in concrete buildings and tunnels, to be more specific, the invention is about an adhesive agent high pressure pumping plug using a non-return bias valve mechanism of the first aspect.

The third and fourth aspects of the present invention are that the invention is about an automatic fixing type plug inserted and automatically fixed to a fluid pumping hole which is formed through spaces in a structure having spaces such as fissures, cracks, and crevices, and used for fluid pumping when pumping fluid such as adhesive agent, waterproof agent into the spaces through the fluid pumping hole with high pressure, and further, the invention is about an automatic fixing type plug for fluid pumping to be fixed liquid-tightly to the fluid pumping hole of the structure without a special work.

The fifth and sixth aspects of the present invention are that the invention is about a chemical solution pumping plug assembly and a chemical solution pumping technique using the assembly, to be more specific, a chemical solution pumping plug assembly and a chemical solution pumping technique using the assembly used for pumping chemical solution between reinforcing plate(s) located outside structures of such as cement concrete pillows or columns and structures.

The seventh, eighth, and ninth aspects of the present invention are that the invention is about a high pressure pumping instrument for fragile structures, which is inserted and fixed to a chemical solution pumping hole in fragile structures having spaces such as fissures, cracks, and crevices, and is used when pumping adhesive chemical solution into the spaces and/or fragile structures through the chemical solution pumping hole with high pressure, and a high pressure pumping technique for fragile structures using the instrument and a funnel of chemical fixing solution, and further, the invention is about a high pressure pumping instrument for fragile structures and a high pressure pumping technique for fragile structures using the instrument and a funnel of chemical fixing solution that can be used in repairing and mending fragile structures such as Tokyo Railroad Station existing since Meiji Era and Atomic-bombed Dome in Hiroshima, or, World Inheritance constructions of the Great Wall of China and Angkor Ruins in Cambodia.

RELATED ART

Conventional non-return bias valve mechanism for a fluid pumping assembly is explained with referring to the following FIG. 5 as an example of grease nipple. The grease nipple comprises a nipple body 50 having cylindrical shape, a coil spring 70 for a non-return bias valve located inside the nipple body 50, a steel ball 60 as the non-return bias valve for closing a pumping entrance of the nipple body 50 biased by the coil spring 70 for the non-return bias valve.

In this case, the steel ball 60 is the non-return bias valve and leakage of grease from pumping entrance could not be prevented completely because a contact with the pumping entrance is a line contact.

However, the leakage described above does not cause a serious problem for construction machines and cars because they are designed and produced for outside-use so a small amount of leakage does not cause serious one. Moreover, in JIS and ISO, harmful leakage is not admitted of course but a small amount of leakage is admitted.

However, in recent years, these nipples are used in wider ranges, for example, they are used as a part or instrument of pumping hardening (adhesive) agent and chemical solution such as epoxy resin or acrylate resin with high pressure. For example, fireproof and durability are demanded for concrete constructions and structures such as inner wall of tunnels, but they may be ruined and cause cracks because of changes of circumstances outside such as difference between high and low temperatures or winds and rains. When those cracks can be treated with only mending treatment or maintenance work, synthetic resin, cement paste, etc. are pumped therein. As examples, low adhesive epoxy, polyurethane, acrylate resin, etc. are the synthetic resin used for the pumping work and inorganic polymer cement paste, organic polymer cement paste, etc. are the cement paste used for the work.

Some of these resins contain strengthened fibers to add mechanical strength. These fibers are caught by the coil spring 70 inside and cause the spring 70 not to function or caught in between pumping exit of the nipple body 50 and the ball 60 to allow backflow of impermissible amount of resin. Further, in cases of repairing concrete surfaces of underground tunnels and tunnels at mountain areas, they may be used under 50 Mpa or higher pressure. In such cases, coil spring for non-return bias valve is pressed completely and can not restored due to pumping pressure and workers get injured by dispersed jets of chemical agent which is discharged from the valve.

And, when repairing concrete surfaces, enormous amount of nipples with non-return bias valve are consumed because nipple bodies are designed to be buried in repairing surfaces. Therefore, development of a non-return bias valve mechanism for a fluid pumping assembly that is in lower price and has no problems in performance is demanded.

Further, as nipples are used in wider ranges, needs for nipples with non-return bias valve in smaller size has increased, but conventional non-return bias valve mechanism has limits to make the size smaller.

Accordingly, a subject to be solved by the present invention is to supply a non-return bias valve mechanism for a fluid pumping assembly that is in lower price and has no problems in performance when used at high pressure.

Another subject to be solved by the present invention is to supply a non-return bias valve mechanism for a fluid pumping assembly that is capable of corresponding to downsizing of non-return bias valve.

Further, another subject to be solved by the present invention is to supply a non-return bias valve mechanism for a fluid pumping assembly that is capable of sealing almost completely resin which contains filler such as strengthening or reinforcing fibers.

Relevant arts of the third and fourth aspects of the present invention are as the following. For example, in concrete constructions and constructions such as tunnels, crevices by cracks, fissures, and rise of materials on surfaces are occurred by many reasons. When a treatment or maintenance work is enough with only repairing, the cracks, synthetic resin or cement paste is pumped in the cracks etc. epoxy resin, polyurethane, acrylate resin, etc. are those of the synthetic resin and inorganic polymer cement paste, organic polymer cement paste, etc. are those of the cement paste.

Conventional high pressure fluid pumping plug 110 shown in FIG. 11 roughly comprises containing a nipple member 112, a male screw member 114, and a cylindrical rubber packing member 116.

The nipple member 112 is formed integrally by a nipple head 112a and a nipple body 112b having hexagonal nut that fit to revolving means such as wrench. Outer form of the nipple head 112a is able to be closely connected to high pressure fluid pumping machines, for example, coupling for high pressure pump or nozzle. On periphery surface of the nipple body 112b, a groove 112c is provided as the nipple body 112b is able to be smashed off by a beating member such as a hammer. The groove 112c goes around the periphery surface of the nipple body 112b of the nipple member 112, and its cross sectional form, for example, U, V, or trapezoidal form is a form that the nipple body 112b is able to be smashed off at the groove 112c by beating mean H such as a hammer. Because the groove 112c goes around the periphery surface of the nipple body 112b, the nipple member 112 at the nipple head side from groove 112c is able to be smashed off when the nipple member 112 is beat from any directions.

As well shown in FIG. 11D, location of the deepest part of a female screw 112e which is cut by center hole 112d of the nipple member 112 is set at open edge side of the nipple body 112b by the location which the groove 112c is formed. The female screw 112e of the center hole 112d of the nipple body 112b screw fits to a stem member 114a which is made by cutting a male screw 114b of a male screw member 114, and depth of its screw fit is shorter than the location which the groove 112c is formed. Accordingly, when the nipple member 112 is beat by the beating mean H, the nipple member 112 side of the nipple head 112a from the groove 112c may be removed separatedly off the high pressure fluid pumping plug easily and certainly because the stem member 114a of the male screw member 114 does not get in.

The male screw member 114 is formed integrally by a large diameter non-return bias valve member 114c inside of which a non-return bias valve is provided and the stem member 114a at the periphery surface of which the male screw 114b is made. As described above, the female screw 112e of the nipple member 112 screw fits to the male screw 114b of the stem member 114a. In central part of the male screw member 114, a central hole 114d which goes through length wise direction is formed. In the example shown, the non-return bias valve is a leaf valve comprises a ball storing member 114e which is made by boring a hole toward the length wise direction inside a non-return bias valve member 114c and has inner diameter wider than its central hole 114d, a ball 114f stored in the ball storing member 114e, and a leaf plate 114g which presses the ball 114f against the central hole 114d under a certain amount of pressure. The leaf plate 114g that is thin toward the lengthwise direction presses the ball 114f against the central hole 114d under a certain amount of pressing pressure. A packing material 116 is a cylindrical rubber packing material.

Pumping work using conventional high pressure fluid pumping plug 110 described above is done as the following.

A hole 136 having a little wider diameter than the periphery diameter of the high pressure fluid pumping plug 110 in accordance with the present invention is bored on a subject to be repaired, for example, a construction wall 134. This hole 136 needs to be reached to a crack 134a occurred on the wall 134. The high pressure fluid pumping plug 110 is inserted to the hole 136 (see FIG. 11A), and the nipple member 112 is revolved in the direction shown as an arrow X by the revolving mean such as a wrench. The packing material 116 caught in between the non-return bias valve member 114c of the male screw member 114 and the edge surface of the nipple member 112 which is screw fit to the male screw 114b of the stem member 114a is pressed and shortened to its length wise direction and at the same time expands to the radial direction and is closely fixed to the hole 136. Next, pumping coupling (not shown) of a fluid pumping machine is installed to the nipple head 112a, and pumping material such as synthetic resin or cement paste is pumped (see FIG. 11B).

Right after the pumping material is pumped, a part projected from the hole 136 of the nipple member 112 is beat by the beating mean H such as a hammer (see FIG. 11C). By this process, the nipple head 112a side from the groove 112c is removed off from the plug 110. In the meantime, the female screw 112e side by the groove 112c of the nipple body 112b is kept screw fit to the male screw 114b cut by the stem member 114a of the male screw member 114 and is left in the plug 110. Therefore, the cylindrical rubber packing material 116 is kept closely fixed to the hole 136 (see FIG. 11D) because it is kept pressed and shortened toward the length wise direction. Accordingly, in case that synthetic resin or cement paste is pumped at high pressure, for example, pressure higher than 30 Mpa, the plug 110 does not come off or loosen from the hole 136, and accidents caused from the pumping material spouting out vaporisingly do not occur. So the pumping material may be pumped under very high pressure, and also synthetic resin or cement paste may be pumped to cracks that do not lead to outer surface in branches as shown in FIG. 11. After the part projecting from the hole 136 of the nipple member 112 is removed, continuously, joint material 138 is filled up in the hole 136 and the work is completed.

In the conventional high pressure fluid pumping plug 110 as described above, at every time when fluid is pumped by inserting the high pressure fluid pumping plug 110 to the hole 136, a part of the nipple body 112b should be rotated by such as hexagonal wrench and rubber packing material 116 should be expanded and closely (or firmly) fixed to the hole 136. Accordingly, a labor to rotate the nipple member 112 for a certain times is not small in case of the number of the plugs 10 becomes hundreds and thousands, and the work is used to be very complicated and time-consuming.

And, its firmness and fixing extent is controlled by a moment (tightening force) transmitted to the hexagonal wrench or rotation number, but both cases have a shortcoming that they do not correspond with firmness and fixing extent between the rubber packing material 116 and the hole 136 completely. For example, pitch difference between the female screw 112e of the nipple member 112 and the male screw 114b of the male screw member 114, a foreign particle which gets in, or deformation of the thread of the screw may cause the rotation of the wrench heavy. Further, in the way to control by rotation number, if the male screw member 114 rotates with the nipple member 112, so-called "idling" causes rubber packing material 116 not to expand efficiently and results in failure of fixing to the hole 136. If synthetic resin or cement paste is to be injected at high pressure in this condition, rubber packing material 116 comes off the hole 136 because of the high pressure and causes an accident that the pumping material spouts out vaporizingly. The pumping material sometimes damages eye-balls if gets in eyes by producing chemical reaction with moisture in eyes.

Supplying a plug with no need for the rotation work and the beating work by a hammer, namely, a fluid pumping automatic fastening-type plug which firmly fixes to inner surface of the fluid pumping hole automatically is the subject to be solved here.

Moreover, supplying a high pressure fluid pumping plug that the plug does not come off the hole even if the pumping material is pumped at high pressure and the work is completed safely and in a short time is the subject to be solved here.

Relevant arts of the fifth and sixth aspects of the present invention is as the following. Shortcomings such as cracks and fissures occur in conventional construction using Portland cement by many causes. By repairing them, the construction made of cement may be used semipermanently.

Conventional repairing ways are many. Some of them are such as just pumping adhering agent into defective parts, or applying and pumping adhering agent with covering outside the defective parts with reinforcing member such as glass fibers, carbon fibers, and reinforcing bars.

However, in case of defects of peeling off and falling of a large part of a concrete construction, a large part of the construction including a repaired part may peel off and fall even if treated by above described repairing ways.

Besides, repairs of concrete manufactured with wrong water ratio, concrete that lost strength by acid rain, cold joint parts, and concrete with too much salt content cannot secure strength by repairing with such as pumping adhesive agent. In these cases, surface of the concrete construction is covered with glass fiber knitted fabric or carbon fiber knitted fabric, further its surroundings are covered with iron plate which is reinforcing member, adhesive agent is pumped through piercing hole bored on the iron plate, and chemical solution such as adhesive agent is pumped between the reinforcing member and the construction.

Moreover, constructions made recent years are made with iron plates that have concrete waterproof layer inside or top thereof and paved and finished up. In case of these constructions, adhesion between the iron plate and the concrete may sometimes be imperfect. The reason is that the concrete shrinks when it hardens and crevice occurs between the concrete and the iron construction.

In this case, too, adhesive agent is pumped between the iron plate and the concrete through piercing hole bored on the iron plate to prevent the peeling off, or to repair already peeled off.

Besides, pumping waterproof agent into a large crevice of a concrete construction is difficult when such waterproof work is accompanied with a large flood of water. In this case, too, an iron plate is fixed to the construction with such as bolts and waterproof agent is pumped in from an opening bored on the iron plate.

When repairing likewise, pumping chemical solution through piercing hole on an iron plate is as the following. That is to say, a packer plug only for concrete is fixed to a piercing hole on an iron plate, and chemical solution is pumped through the plug.

As shown in FIG. 16A, the packer plug 270 comprises a nipple member 280 for pumping chemical solution from outside, a non-return bias valve 290 made in the above described construction that is positioned at the opposite side of the nipple member 280, and a connecting pipe member 300 that connects the nipple member 280 and the non-return bias valve member 290 distance changeable by rotation driving of the described nipple member 280.

And, a sleeve body 310 made of elastic member is located at periphery of above described connecting pipe 300 and at the same time between the nipple member 280 and the non-return bias valve member 290. The sleeve body 310 covers around above described connecting pipe 300, may in a normal state be inserted into an opening 204 of above reinforcing plate material 202, deforms as shown in FIG. 16B when above nipple member 280 is rotated and driven to make the distance between the nipple member 280 and the non-return bias valve 290 shorter, and sticks to and at the same time pinches inner surface of the piercing hole of the iron plate to form expanding member 311 and 312.

However, using above described packer plug has following problems.
(1) When pumping pressure of chemical solution is set high, the plug jumps out, the chemical solution leaks, or the chemical solution does not go in between iron plate and concrete successfully.
(2) The plug does not stick at right angles to the plate so hard to pump.
(3) The non-return bias valve of the plug does not function and backflows.

Therefore the subject of the fifth and the sixth aspects of the present invention is to solve the said problems and supply a chemical solution pumping member and a chemical solution pumping technique using the member which may be fixed firmly to the reinforcing plate material and may pump chemical solution certainly.

To put it concretely, the present invention aims to satisfy the following conditions.
(1) Chemical solution does not leak even if it is pumped under pumping pressure 20 MPa.
(2) Leakage at the plug does not occur when pumping is under pressure 10 MPa.
(3) The position of the plug is stable when pumping.
(4) The position of the plug is stable when the plug is inserted.
(5) Diameter of the hole on the iron plate can be equal to or less than 10 mm.
(6) Pumping route has a cross sectional area of equal to or more than 2 mm.
(7) Grease pumping apparatus distributed in general market can be used by adopting grease nipple standard for cars of ISO standard.
(8) Inner parts can be disassembled and reused.
(9) The nipple provides hexagonal opposite sides for fastening.

Relevant arts of the seventh and eighth aspects of the present invention are as the following. Among World Inheritance such as the Great Wall of China and Angkor Ruins, many objects that is in a critical situation and needed to be repaired or preserved exist. Among them, constructions made of stones are especially problematic because their preservation is difficult. Also in Japan, such as Tokyo Railroad Station existing since Meiji Era and Atomic-bombed Dome in Hiroshima should be preserved in today's appearance. Materials are stones, concrete, bricks and the best materials are used in technology at that time. However, these materials are andesite or granite easy to process, and bricks are made of nearly sun-dried materials because pottery made by high temperature cannot be produced. These constructions fall to pieces crumbly from girth or big lumps break down by fissuring in a hundred or a thousand years. Many of the reasons of the phenomena are natural destruction by earthquakes, changes of temperature, ultra violet rays, carbon dioxide, etc. In recent years, acid rain, destruction by men, etc. are added and progress of the collapses are accelerated.

Repairs and preservations without losing original forms and faculties of these precious constructions need the latest technology. These constructions are made of materials different from the same of the modern period, such as stones made of materials easy to quarry, bricks having solidity and density near sun dried, and concrete using materials made by as if puddling clay. And, reinforcing bars are not used.

The recent technology is hard to correspond with these constructions and low pressure pumping techniques and high pressure pumping techniques of adhesive chemical solution cannot be adopted. Conventional high pressure pumping techniques pump chemical solution at high pressure by pressing and fixing high pressure pumping plug to chemical solution pumping hole. However, powerful packer function of the high pressure pumping plug may not be used for fragile materials such as bricks, so the high pressure pumping plug cannot be used after all. If these fragile materials are pressed forcively, hole is destroyed and loses seal function.

Besides, for repairing constructions of the modern period, a small amount (30~100 cc per a repairing position) of chemical solution, for example, adhesive agent or waterproof agent may perform repair function. However, constructions of the ancient times have more crevices and each crevice is large, so chemical solution as 10 to 100 times as much in amount needed to constructions of the modern period is needed and at the same time, reinforcing anchor is definitely needed.

And, spaces such as cracks and fissures by many reasons and cement unfilled spaces between bricks occur or exist in historic constructions, brick-built constructions, and concrete constructions. These fragile structures cause irreparable situations by being destroyed from unpredictable places when pumped adhesive chemical solution at high pressure. Therefore, it is said that even experts cannot pump adhesive chemical solution at high pressure into these fragile structures.

Alternative to the high pressure pumping, techniques or apparatus using the techniques for pumping fluid such as adhesive agent and waterproof agent into fragile structures at low pressure are developed. Low pressure pumping techniques mainly have two kinds. One is a technique of pushing out adhesive chemical solution fluid such as adhesive agent and waterproof agent stored in container by applying compressing pressure of spring or shrinking pressure of rubber band or rubber bag, and the other is a technique of adding forming agent and hardening agent to fluid and using the forming force, pumping fluid gradually and by taking time into cracks, fissures, and spaces made by surface materials breaking the surface. The low pressure pumping technique has a shortcoming that repairing effect cannot be in full play when forming chemical solution does not reach to the depth of cracks. In this case, if the forming pressure is set higher, apprehension that low pressure pumping pump or pumping plug comes off chemical solution pumping hole occurs, and further, leakage of forming chemical solution is a problem.

Moreover, chemical solution used in the low pressure pumping technique is low in tenacity so is mostly absorbed by materials such as bricks and stones and is not used for connecting lumps of bricks and stones. Crevices in bricks and stones of these constructions are very large and amount of chemical solution pumped is not from 30 to 50 cc as normally used but from 500 to 2000 cc. Accordingly, the recent low pressure pumping techniques cannot be used for these fragile structures.

Inventors of the present invention examined diligently earthquake-proof of the present standard and prevention of falling of outer wall material of the old constructions. As a result, they discover that connecting each block such as brick and lump of stones by filling up high tenacity resin into inner spaces of the constructions and by adding anchor if in short of strength is the best way.

Accordingly, development of a high pressure pumping apparatus for fragile structures and a high pressure pumping technique for fragile structures using the high pressure pumping apparatus that is able to fill up these resin and to establish the anchor is demanded.

Further, when a fragile structure as a repairing object is a historical construction, chemical solution can never be stuck to or permeated into its surface. Therefore, development of instrument to prevent these is demanded.

DISCLOSURE OF THE INVENTION

The invention mentioned in claim 1 solving above mentioned problems is to supply a non-return bias valve mechanism for a fluid pumping assembly established to prevent backflow of fluid when the fluid is pumped under pressure, and comprises a body member having a longitudinal hole formed toward an axis direction thereof and a radial hole or holes extending from the longitudinal hole to a radial direction and going through to the outside and a ring shape sealing member made of material having elasticity such as of rubber which is expandable that seals the radial hole(s) of the body member.

A non-return bias valve mechanism for a fluid pumping assembly of the present invention comprises only two members basically. Moreover, on one hand, the body member is made of only processing or boring the longitudinal hole and the radial hole, and on the other hand, only using the ring shape sealing member made of material having elasticity such as of rubber which is expandable is enough, so its structure is very simple and it is able to be produced in low price, and the elasticity of the ring shape sealing member may seal the radial hole by strength at will. Therefore, using it at high pressure does not have any problems in capacity.

Further, the body member and the ring shape sealing member may be sealed by surface contact easily, and they may be sealed almost completely even if filler such as strengthening or reinforcing fibers are contained because member or part that gets caught by the fiber does not exist in the body member.

The invention mentioned in claim 2 is the non-return bias valve mechanism for the fluid pumping assembly mentioned in claim 1 being characterized in that the ring shape sealing member comprises a O-ring having a round shape in a cross section, and at the same time, a semi-circular recess in a cross section to which said O-ring fits is formed at periphery including the position that the radial hole(s) of the body member is(are) formed.

Because of using the simplest shape of O-ring, production cost lowers to the minimum. And, the recess is semi-circular that fits to said O-ring so the process of the recess of the body member could be produced easily and in low price by cutting and shaving process or forging.

The invention mentioned in claim 3 is the non-return bias valve mechanism for the fluid pumping assembly mentioned in claim 1 being characterized in that the ring shape sealing member comprises a O-ring having a four-sided shape in a cross section, and at the same time, a four-sided recess in a cross section to which said O-ring fits is formed at periphery including position that the radial hole(s) of the body member is(are) formed.

O-ring having four-sided shape in a cross section could be used instead of round shape one. Sealing may be completed by making contact area of the body member and the ring shape sealing member larger.

The invention mentioned in claim 4 is the non-return bias valve mechanism for the fluid pumping assembly mentioned in claim 1 being characterized in that one or more of the radial hole(s) of the body member are formed.

The number of the radial hole(s) may be any as long as the O-ring could seal all the radial holes. Amount of fluid that can be discharged increases as the number of the radial hole(s) increases.

The invention mentioned in claim 5 is the non-return bias valve mechanism for the fluid pumping assembly mentioned in claim 1 being characterized in that fluid flowing route that goes through from the position of the radial hole(s) of the recess in the axis direction on the periphery surface of the body member is(are) formed.

Pressure of discharging fluid expands O-ring and flows out from the body member. At that time, if the fluid flowing route that goes through from the position of the radial hole(s) of the recess in the axis direction on the periphery surface of the body member, fluid flows smoothly through the fluid flowing route. Pumping fluid into objective parts may be carried out certainly because lost of fluid is small.

The second aspect of the present invention is a chemical solution high pressure pumping plug used for repairs of cracks occurred in concrete construction such as buildings and tunnels etc., comprises a metallic nipple body having a nipple head that can connect liquid-tightly with a high pressure fluid pumping apparatus, for example, a pumping coupling of high pressure pump or a chuck type nozzle, and a connecting part such as a hexagonal nut member that connect with a rotating drive instrument such as a wrench, a cylindrical rubber packing that contact with a hole wall bored on the construction and fixed closely when expanded outside in radial direction by compressing in the axis direction, a non-return bias valve mechanism mentioned in one of claims 1 to 5, and a screw pipe that goes through inside said rubber packing and is screw connected with the nipple body and the non-return bias valve at both sides.

Because chemical solution may be pumped at high pressure in a state that the chemical solution high pressure pumping plug is closely or firmly fixed to the hole wall bored on constructions such as concrete constructions or tunnels, the chemical solution may be pumped under much higher pressure compared to the conventional pumping pressure. Further, the non-return bias valve mechanism mentioned in one of claims 1 to 5 has better sealing function of fluid even though it is simple in structure compared to the conventional non-return bias valve mechanism, so it can enjoy pumping at high pressure as described above. Moreover, downsizing is possible, for example, it may be adopted in the so-called "a packer hole" having small diameter bored on cross joint between tiles conventionally said impossible.

The invention is characterized in that a recess which may break in two pieces by beating the nipple head with beating means such as a hammer is formed in middle of the hexagonal nut of the said nipple body.

By removing only the nipple head side, work efficiency improves because it is possible to move to work with next hole without waiting while chemical solution hardens.

The invention is characterized in that ring type projection (s) and/or projection(s) in the axis direction adjacent to edge at valve nut body side on outer surface of said rubber packing is(are) established.

By the ring type projection(s), packing function, or function not to getting out easily by coming in contact with the hole wall bored on the concrete wall when the nipple body is screwed in the screw pipe and rubber packing is expanded like a barrel, is provided. On the other hand, the projection (s) in the axis direction prevent(s) the whole chemical solution high pressure pumping plug from idling when the nipple body is rotated.

The invention is characterized in that a washer of small coefficient of friction and a washer with catching functional member are intervened at both edges of said rubber packing.

When the nipple body is rotated in a state that the adhesive agent high pressure pumping plug is inserted into the hole bored on the construction wall, the nipple body is being screwed into the screw pipe without idling (a phenomenon in which both the nipple body and the screw pipe rotate together). Accordingly, the cylindrical rubber packing is compressed in the axis direction and comes in close contact with and is fixed to the hole wall.

The third aspect of the present invention is an automatic fixing type plug inserted and automatically fixed to a fluid pumping hole formed through spaces in a structure having the spaces such as fissures, cracks, and crevices, and used for fluid pumping when pumping fluid such as adhesive agent, waterproof agent into the spaces through the fluid pumping hole with high pressure comprising, an inner assembly having a central hole formed in the axis direction and radial hole(s) going through to the outside extending from the central hole to the radial direction, and having roughly conic surface the outer surface of which becomes opposite tapered toward opening of the central hole and establishing water-tight pinching mean of fluid pumping member which pumps fluid into inner side of the central hole, and, an outer sleeve installed slidably in the axis direction of said inner assembly on periphery of the inner assembly, having a valve member for sealing radial hole(s) of the inner assembly which could be opened and shut and conic inner surface which fits to the opposite tapered conic surface of the inner assembly, and made of elastic material that has smaller friction strength between said outer sleeve and the inner assembly by a certain rate than friction strength between fluid pumping hole of the structure and the outer sleeve.

When fluid is pumped at high pressure to the present automatic fixing type plug for fluid pumping, the outer sleeve expands and causes fluid flowing out into the fluid pumping hole at high pressure. Accordingly, the outer sleeve is pressed to the inner surface of the fluid pumping hole and is fixed. Meanwhile, the inner assembly slides in the axis direction toward the opening of the central hole to the outer sleeve. The inner assembly slides in the axis direction while the roughly conic surface tapered opposite toward opening of the central hole established on its periphery pushes the conic inner surface which fits to the outer sleeve toward the outside. Accordingly, the outer sleeve is expanded toward radially outside direction and the outer sleeve and the inner surface of the fluid pumping hole are closely or firmly fixed.

The fourth aspect of the present invention is an automatic fixing type plug inserted and automatically fixed to a fluid pumping hole formed through spaces in a structure having the spaces such as fissures, cracks, and crevices, and used for fluid pumping when pumping fluid such as adhesive agent, waterproof agent into the spaces through the fluid pumping hole with high pressure comprising, an inner assembly having a central hole formed in the axis direction and radial hole(s) going through to the outside extending from the central hole to the radial direction, and having conic surface the outer surface of which becomes opposite taper toward opening of the central hole and establishing water-tight pinching mean of fluid pumping member which pumps fluid into inner side of the central hole, an elastic valve member for sealing radial hole(s) of the inner assembly which could be opened and shut, and, an outer sleeve installed slidably in the axis direction of said inner assembly on periphery of the inner assembly, having conic inner surface which fits to the opposite taper conic surface of the inner assembly and projection(s) which come(s) in contact with the fluid pumping hole of the structure, and made of elastic material that has smaller friction strength between said outer sleeve and the inner assembly by a certain rate than friction strength between the fluid pumping hole of said structure and the projection(s) of said outer sleeve.

When fluid is pumped at high pressure to the present automatic fixing type plug for fluid pumping, the valve member deforms elastically and discharges fluid to the fluid pumping hole through the radial hole(s) of the inner member. Meanwhile, the inner assembly slides in the axis direction toward opening of the central hole to the outer sleeve. The inner assembly slides in the axis direction while the roughly conic surface tapered opposite toward opening of the central hole established on its periphery pushes the conic inner surface which fits to the outer sleeve to the outside. Accordingly, the outer sleeve is expanded toward radially outside direction and the outer sleeve and the inner surface of the fluid pumping hole are closely or firmly fixed.

The invention is characterized in that the valve member is a metallic ring shape sealing member for sealing the radial hole(s) of the inner member, resiliently expandable and cut by one part, or, a ring type rubber sealing member extending therearound without a cut.

The radial hole(s) of the inner member may certainly be sealed that can be opened and shut by an easy and simple structure. Diameter can be small because of the simple structure. Strength can be changed in any ways, so malfunction does not occur even though flowing at high pressure more than 40 MPa.

The invention is characterized in that two or more opposite tapered conic surfaces of the inner body and outer sleeve conic surface having shape fitting to the opposite tapered conic surfaces of the inner body are formed in the axis direction.

The outer sleeve is expanded toward radially outside direction by the inner member and the outer sleeve and the inner surface of the fluid pumping hole is closely fixed at plural parts in the axis direction. Accordingly, possibility that fluid spouts outside the fluid pumping hole is decreased to the minimum.

The invention is characterized in that inclination to the shaft of opposite tapered conic surface of the inner body and outer sleeve conic surface having a shape complementary to the opposite tapered conic surface of the inner body is from 3 to 10 degrees.

In this range, the outer sleeve and fluid pumping hole come in contact with each other only slightly, and the inner member slides to the outer sleeve toward outside in the axis direction because friction strength between the outer sleeve and the inner member is smaller than friction strength between the outer sleeve and fluid pumping hole. Accordingly, the outer sleeve is expanded toward radially outside direction and the outer sleeve and the inner surface of the fluid pumping hole is closely fixed.

The invention is characterized in that the inner member is produced by non-metallic material such as engineering plastic.

The automatic fixing type plug for fluid pumping is disposable and not reused and buried in fluid pumping hole. Producing the inner member by non-metallic material protects not only the automatic fixing type plug but also the structure, in which said plug is buried, from being ruined by rust and chemical reactions. Further, in case of using the automatic fixing type plug of fluid pumping for repairing road surface, influence to car tires may be the minimum.

The fifth aspect of the invention supplies a chemical pumping plug body, which is used to be fixed to reinforcing plate material outside structure objective to be repaired, for pumping chemical solution through a piercing hole formed in said reinforcing plate material, and for filling the chemical solution between the structure objective to be repaired and the reinforcing plate material comprising, an elastic member having a flange member coming in contact with around the piercing hole of the above described reinforcing plate material, shape insertable to said piercing hole, and a sleeve body that is able to pinch liquid-tightly and strongly with said reinforcing member between said flange member after inserting pointing side thereof into said piercing hole.

The invention is characterized in that the mentioned plug member comprises a nipple member for chemical solution pumping from outside, a non-return bias valve member formed in opposite side of the nipple member and located in mentioned structure side, a connecting pipe member which connects the nipple member and the non-return bias valve member distance changeably by mentioned nipple member being driven, and a sleeve body having a flange member which includes an elastic member and a pinch member, said elastic member covering the connecting pipe member and coming in contact with outside of the reinforcing plate material, said pinch member which is formed by driving the mentioned nipple body to expand the part of the said sleeve body, while covering around mentioned connecting pipe member, can be inserted into the piercing hole of the reinforcing plate material in a normal state, and pinches the reinforcing member with the flange member when expanded.

The invention is characterized in that the nipple body is driven by rotation.

The invention is characterized in that the structure is formed with concrete and a bore into which pointing part of pumping plug is inserted is bored.

The sixth aspect of the invention provides a process for pumping chemical solution through a piercing hole formed in a reinforcing plate material and filling the chemical solution between structure objective to be repaired and the reinforcing plate material after locating the reinforcing plate material outside the structure objective comprising steps of, inserting pointing side of sleeve body of the plug member formed by elastic member having a flange member coming in contact with around the piercing hole of the above described reinforcing plate material and a sleeve body shaped insertable to said piercing hole, deforming the sleeve body by manipulating it from the reinforcing plate material from outside, pinching liquid-tightly and strongly with said reinforcing member between the sleeve body and the flange member, and pumping chemical solution between the structure and the reinforcing member.

The invention is characterized in that the mentioned plug member comprises a nipple member for chemical solution pumping from outside, a non-return bias valve member formed in opposite side of the nipple member and located in mentioned structure side, a connecting pipe member which connects the nipple member and the non-return bias valve member distance changeably by mentioned nipple member being driven, and a sleeve body having a flange member which includes an elastic member and a pinch member, said elastic member covering the connecting pipe member and coming in contact with outside of the reinforcing plate material, said pinch member which is formed by driving the mentioned nipple body to expand the part of the said sleeve body, while covering around mentioned connecting pipe member, can be inserted into the piercing hole of the reinforcing plate material in a normal state, and pinches the reinforcing member with the flange member when expanded, said process further includes the steps of, deforming the sleeve body to form a pinching or expanded portion by manipulating the nipple member from the outside of the reinforcing plate material so as to pinch liquid-tightly and strongly with said reinforcing member between the deformed sleeve body and the flange member, and pumping chemical solution through the nipple member between the structure objective and the reinforcing member.

Accordingly, pinch member is formed by deforming the sleeve body by manipulating the nipple member from outside the reinforcing plate material, said reinforcing member is held liquid-tightly and strongly between the sleeve body and the flange member, and chemical solution from the nipple member is pumped between the structure objective and the reinforcing member.

The invention is characterized in that.the nipple member is driven by rotation.

The invention is characterized in that structure is made with concrete and a bore into which pointing member of pumping plug is inserted is formed.

In accordance with the inventions the sleeve body may hold the reinforcing member between the flange body liquid-tightly and strongly, and the pumping plug is installed perpendicularly to the reinforcing plate material and leakage of solution does not occur.

In accordance with the inventions the non-return bias valve is provided in the pumping plug member, so chemical solution does not backflow. To use rubber as the non-return bias valve makes it possible to be decomposed and reused.

In the inventions mentioned in the above by adhering the sleeve body to the non-return bias valve, the reinforcing plate material can be pinched or sandwiched well with the flange member without the pointing part of the sleeve spreading when the sleeve body is fastened. Further, to provide opposite tapered abutting surfaces at connecting part between the non-return bias valve and the sleeve member it can prevent the pointing part of the sleeve from spreading.

In accordance with the inventions the pumping plug can be installed to the reinforcing plate material without a special tool because it can be used just by rotating the nipple. Further, the hexagonal opposite sides for winding or rotating may be formed at the nipple member, so winding rotation is easily done.

In accordance with the inventions the pumping plug may be installed and chemical solution may be pumped even if a space or distance between the structure and the reinforcing plate material is small, because the hole to which the pointing part of the pumping plug is inserted is bored in the structure as well.

The seventh aspect of the invention provides a high pressure pumping instrument for fragile structures which is inserted and fixed to a chemical solution pumping hole formed in fragile structures having spaces such as fissures, cracks, and crevices, and is used when pumping adhesive chemical solution into the spaces and/or fragile structures through the chemical solution pumping hole at high pressure comprising, a thin and long pipe member having a central hole that lets adhesive chemical solution pass and an outer diameter smaller than the inner diameter of chemical solution pumping hole, a nipple member positioned at one side of the central hole of the pipe member and flowingly connectable to chemical solution pump, a non-return bias valve mean installed inside the nipple member or provided as separated part at other edge of the central hole of the pipe member which prevents backflow of chemical solution pumped into deep side of chemical solution pumping hole by passing through the central hole of the pipe member, and a sealing member for chemical fixing solution installed at periphery of middle part of the pipe member and having a bigger diameter than the inner diameter of chemical solution pumping hole and at the same time easily deformable to smaller diameter than that.

The invention is the high pressure pumping instrument for fragile structures being characterized in that a male screw is provided at least in one edge of outer surface of the pipe member, and non-return bias valve mean provided separately as a non-return bias valve member and/or the nipple member is fixed to an edge of said pipe member by screw connecting.

The invention is characterized in that the sealing member is made of cylindrical spongy member and is fixed by both sides thereof to the pipe member.

The invention is characterized in that structural weak point is established at position distanced a certain length from a broken off side which the nipple member of the pipe member is installed so the broken off side may be destroyed and separated from a remaining side which is left in the chemical solution pumping hole when beaten by beating tool such as a hammer.

The invention is characterized in that the non-return bias valve comprises, a central hole extending in the axis direction, at least one radial hole extending to the radial direction from deep part of said central hole going through to the outside, a O-ring for sealing elastically outside opening(s) of the radial hole(s), and fitting mean established in periphery part of said non-return bias valve member which fits to a rotating tool and rotates said non-return bias valve member relatively to the pipe member.

The eighth aspect of the present invention provides a process for pumping adhesive fixing solution into fragile structures having spaces such as fissures, cracks, and crevices at high pressure comprising steps of, boring a chemical solution pumping hole in said fragile structure, inserting the high pressure pumping instrument for fragile structures into said chemical solution pumping hole with a part at the nipple member side of the high pressure pumping instrument being projected from said chemical solution pumping hole, fixing said high pressure pumping instrument to said chemical solution pumping hole by injecting and hardening chemical fixing solution between said high pressure pumping instrument and said chemical solution pumping hole, and flowingly connecting the nipple member of said high pressure pumping instrument to a pump for pumping the chemical adhesive solution and pumping the chemical adhesive solution into the chemical solution pumping hole.

The invention is the process for pumping adhesive fixing solution into fragile structures mentioned in claim 29 being characterized in that the chemical solution pumping hole is bored at downward inclination of 15 to 45 degrees toward inside of fragile structure.

The invention characterized in that chemical adhesive liquid is pumped to high pressure pumping instrument, in an order from lower to higher positions, inserted to each of the chemical solution pumping holes bored in perpendicular direction.

The invention is characterized in that said process further including steps of, stopping pumping the chemical adhesive liquid into said chemical liquid pumping hole after confirming that the chemical adhesive liquid overflows from the high pressure pumping instrument positioned thereabove in the case that said high pressure pumping instrument is inserted into said chemical fluid pumping hole with the nipple member being not installed and said chemical adhesive liquid is pumped into high pressure pumping instrument positioned below, and installing the nipple member to the high pressure pumping instrument positioned above from which chemical adhesive liquid overflows and pumping the chemical adhesive liquid thereinto at high pressure.

The invention is characterized in that, after the step of pumping the chemical adhesive liquid, said process further includes a step of removing projected part from said chemical liquid pumping hole of said high pressure pumping instrument by beating.

The invention is characterized in that said process further includes steps of, boring chemical liquid pumping holes in a zigzag manner in which each of said chemical liquid pumping holes reaches to the other side going through the space, occurred in said fragile structures such as fissures or cracks extending to surface of said fragile structures, from one side of fissure or crack and the chemical pumping hole formed next to it reaches to one side from the other side, and stopping pumping the chemical adhesive liquid into said chemical liquid pumping hole after confirming that the chemical adhesive liquid overflows from the high pressure pumping instrument positioned adjacent to it in the case that said high pressure pumping instrument is inserted into said chemical fluid pumping hole with the nipple member being not installed and said chemical adhesive liquid is pumped into a high pressure pumping instrument, and installing the nipple member to the high pressure pumping instrument positioned adjacent thereto from which the chemical adhesive liquid overflows and pumping the chemical adhesive liquid to the high pressure pumping instrument at high pressure.

The ninth aspect of the present invention provides a funnel for chemical fixing agent, used when pumping the chemical fixing agent between high pressure pumping instrument and chemical liquid pumping hole to fix the high pressure pumping instrument to chemical liquid pumping hole comprising, hole sealing part of roughly cylindrical shape having a through hole into which a pipe member of high pressure pumping instrument is inserted in the axis direction and a guide recess formed adjoining the through hole into which nozzle that injects the chemical fixing agent is inserted, and skirt shaped part formed integrally to said hole sealing part.

The invention is characterized in that, said funnel further includes a stopping part coming in contact with entrance of said chemical liquid pumping hole is formed on outer surface of connecting part of said hole sealing part and said skirt shaped part, and a projection for deciding position which fits in structural weak point formed in a pipe member of said high pressure pumping instrument is formed at bottom edge of said inserting hole of the hole sealing part.

BRIEF EXPLANATION OF DRAWINGS

FIG. 7 is a cross section view of an embodiment of an automatic fixing type plug for pumping fluid according to the fourth aspect of the present invention and 7A and 7B each shows the status before and after fluid is pumped.

FIG. 8 is a cross section view of an another embodiment of an automatic fixing type plug for pumping fluid according to the fourth aspect of the present invention and 8A and 8B each shows the status before and after fluid is pumped.

FIG. 9 is a cross section view of an another embodiment of an automatic fixing type plug for fluid pumping according to the fourth aspect of the present invention and 9A and 9B each shows the status before and after fluid is pumped.

FIG. 10 is a cross section view of another embodiment of an automatic fixing type plug for fluid pumping according to the fourth aspect of the present invention and 10A and 10B each shows the status before and after fluid is pumped.

BEST PRACTICE OF THE PRESENT INVENTION

The non-return bias valve mechanism of the fluid pumping body according to the present invention is explained in details on basis of the embodiment as shown in figures.

Figure 1:
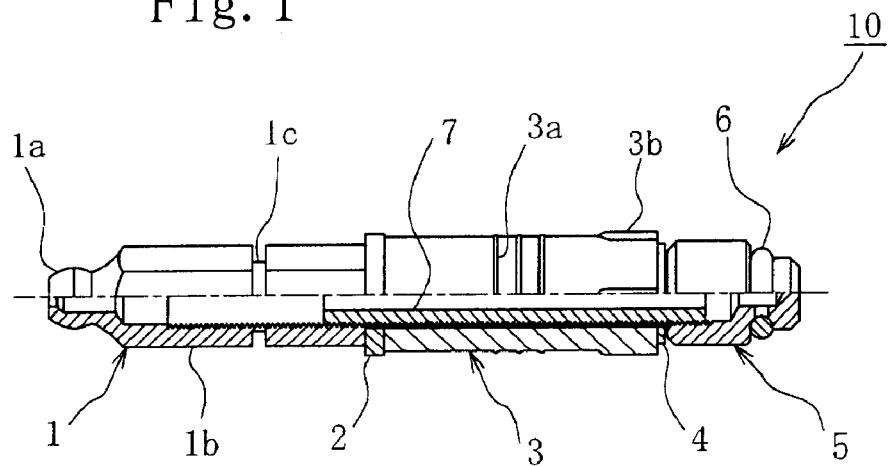
FIG. 1 is a front view, a lower half of which is shown in cross section, of an embodiment of the chemical solution high pressure pumping plug which is used for repair, etc. of cracks generated in such structures as concrete structures, tunnels, etc. to which the non-return bias valve for chemical solution pumping mechanism according to the present invention is applied.

FIG. 1 is a front view, the lower half of which is shown in cross section, showing a non-return bias valve mechanism of a fluid pumping body according to the present invention is applied to a high pressure chemical solution pumping plug which is used for repair, etc. of cracks generated in concrete structures, tunnels, etc.

High pressure chemical solution pumping plug 1010 mainly includes a metal nipple body 1, a nylon washer 2, a rubber packing 3, a washer 4 having inner teeth 4a, a metal valve nut body 5, a rubber O-ring 6, and a screw pipe 7, a Non-return bias valve of fluid pumping body according to the present invention comprises the valve nut body 5 and the O-ring 6.

The nipple body 1 has a nipple head 1a and a hexagonal nut 1b which is connected with a rotating driving tool such as a wrench, etc. Recess 1c is made in the middle of the hexagonal nut 1b and the nut can be broken into two pieces by beating the nipple head 1a by a hammer, etc. The nipple body 1 can be made easily using steel or brass in the same manner as like the conventional nipple for grease pumping. The outside of the nipple head 1a is designed to connect in water tight with pumping machine of high pressure fluid such as a coupling of high pressure pump or nozzle. For example, in an embodiment shown in FIG. 1 the outside of the nipple head 1a is spherical as known in public. For example, a nipple can be manufactured in the same specifications as automotive grease nipple which is a standard of high pressure pumping.

In a preferred embodiment shown in figures the whole nipple body 1 comprises hexagonal nut. Wherever a wrench is connected on the nipple body 1, the nipple body 1 can be rotated and work efficiency gets better.

The nylon washer 2 may be made of DERURIN, nylon, etc. which is suitable for light rotation and bearable against high pressure.

As for material of rubber packing it is preferred to use nytril rubber (NBR), hydrogenated nytril rubber (HNBR), butadien rubber (BR), butadien styrene rubber, etc, having anti-oil and anti corrosion characteristics. Its outer surface has three lines of ring type protrusion 3a and four lines of lengthwise protrusion 3b neighboring on the edge of valve nut body 5 side. The former is to make the nipple body 1 have a tight contact with a hole wall and difficult to be removed from a hole in concrete wall (having packing function) when the nipple body 1 is screwed into the screw pipe 7 and the rubber packing 3 is expanded like a barrel. On the other hand the latter is to avoid idle run of high pressure chemical solution pumping plug 1010 when the nipple body 1 is rotated.

Figure 2A:
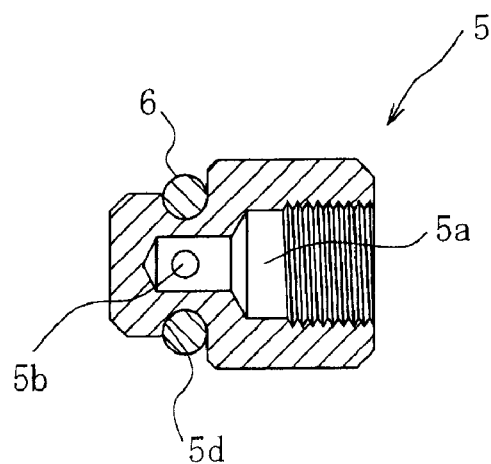
FIG. 2A is an enlarged cross section view of the nut of the valve shown in FIG. 1
Figure 2B:
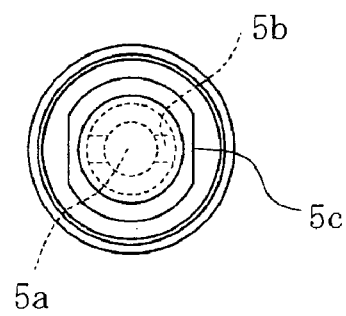
FIG. 2B is its left side view.

The valve nut body 5 is made of metal such as SUS or high strength plastic and can be used for high pressure pumping. The valve nut body 5 has a perpendicular bore 5a extending from one end and radial hole(s) 5b which extend (s) to the radial direction from the perpendicular bore to the outside as shown in FIG. 2. Incidentally the radial hole(s) 5b can be one or more. The periphery of the valve nut body 5 including the portion where the radial hole(s) 5b is(are) located has recess 5d, cross section of which is semi-circular, to which O-ring 6 having circular cross section is attached or fitted. Further the periphery on the other edge of the valve nut body 5 has a fluid passage 5c extending from the location of radial hole(s) 5b of recess 5d to the perpendicular direction. Fluid discharged under high pressure from the perpendicular bore 5a and the radial hole(s) 5b forms passageway through O-ring 6 made from elastic material such as rubber, etc. and is discharged to outside from this fluid passage 5c.

Figure 4:
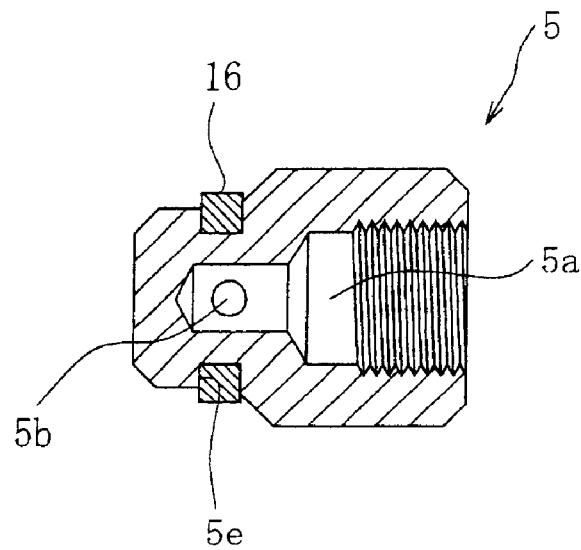
FIG. 4 is an enlarged cross sectional view showing an another embodiment of the valve nut body shown in FIG. 1.
Figure 5:
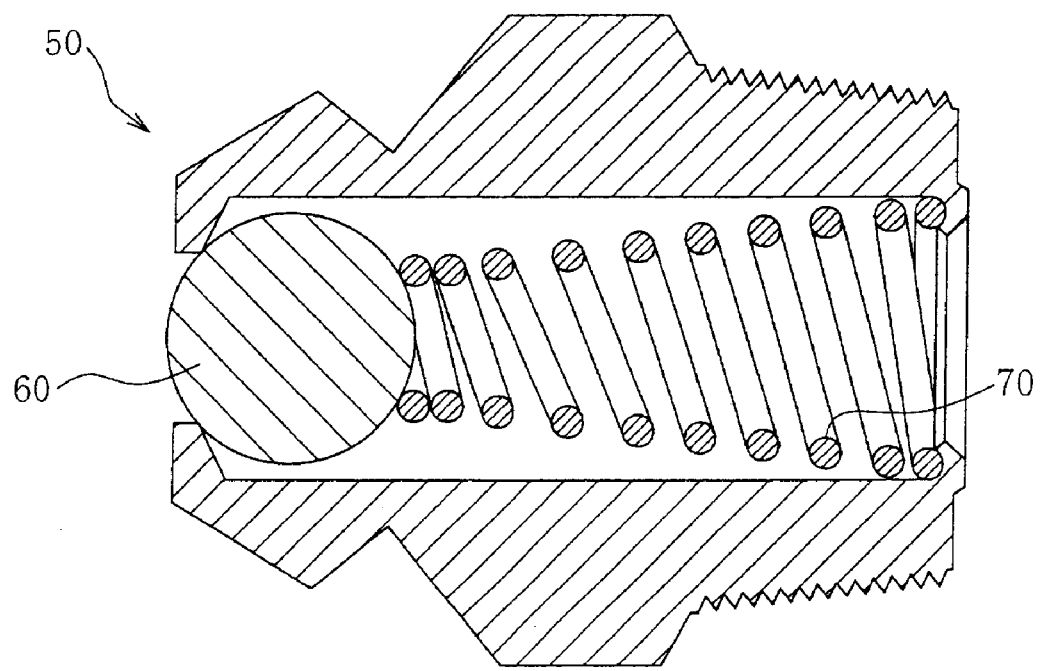
FIG. 5 is a longitudinal cross sectional view of a conventional non-return bias valve.
Figure 6:
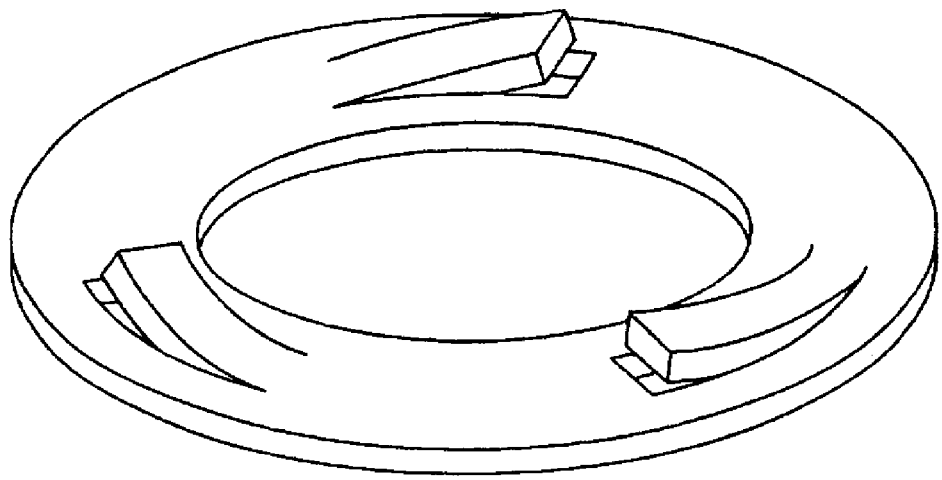
FIG. 6 is a diagonal view of a washer used in the high pressure adhesive pumping plug shown in FIG. 1.
Figure 11A:
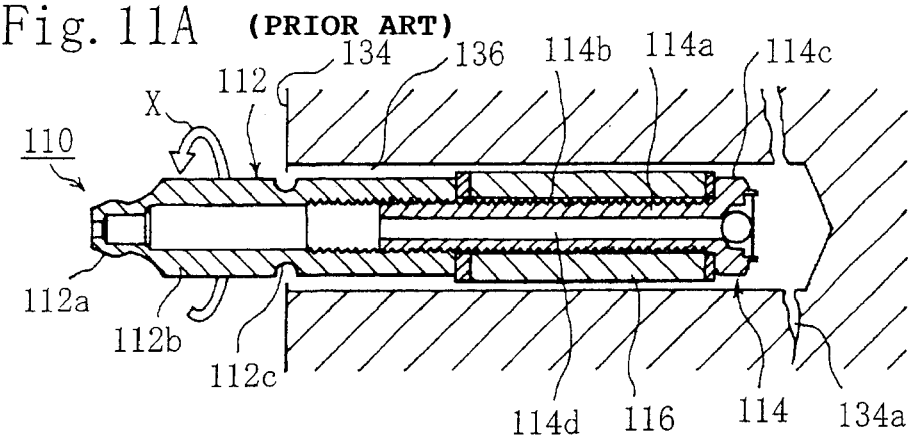
FIGS. 11A through 11D are cross section views showing each step of a method for using a conventional plug for high pressure fluid pumping.
Figure 11B:
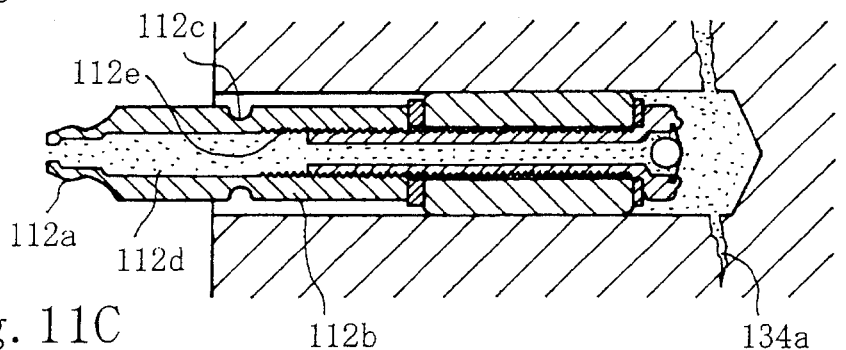
Figure 11C:
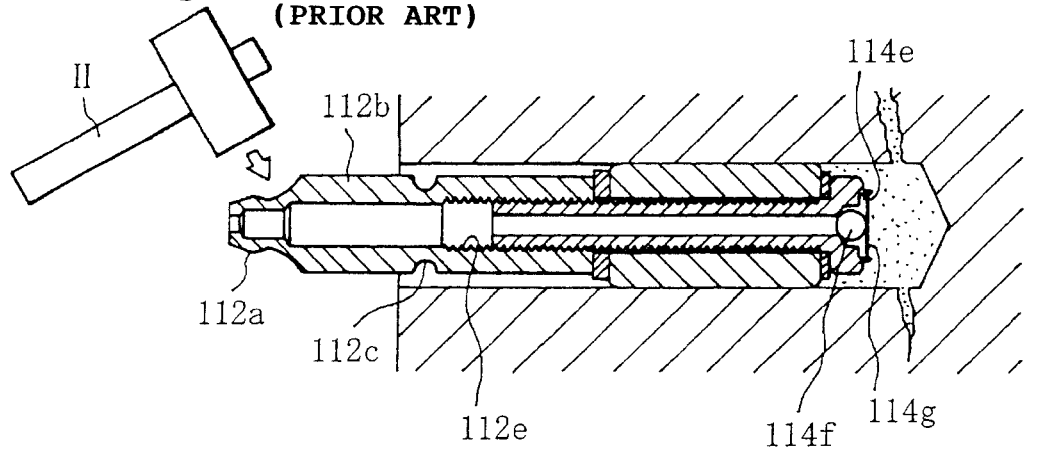
Figure 11D:
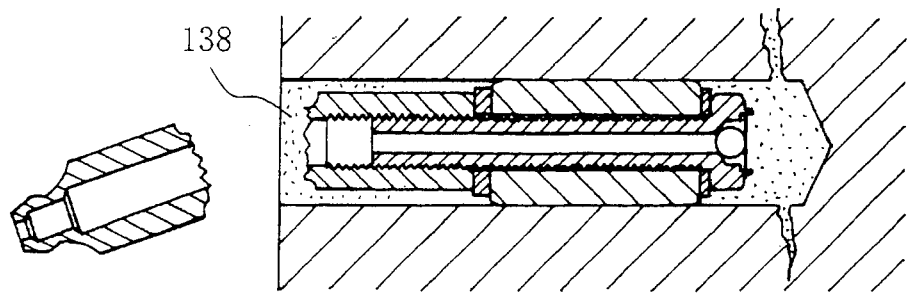

In a preferred embodiment shown in figure, the O-ring 6 having circular cross section is used as a ring shape sealing member having elasticity capable of being opened which seals the radial hole(s) 5b of the valve nut body 5. Other shapes of cross section can, of course, be used. For example, the O-ring 16 having a square cross section (shown in FIG. 4) or an oval one can be used among others. In such cases gap where the O-ring is fitted must be modified in accordance with square cross section of a recess 5e or an oval cross section.

The O-ring 6 is attached to the inside of the recess 5d having semi-circular cross section and contacts with the surface of the semi-circular face which is formed on the periphery including the location of the radial hole(s) 5b of the valve nut body 6. With the above sealing can be almost perfect, though seal between the valve nut body 5 and the O-ring 6 is simple. In addition, because of surface seal and not because of line seal sealing can be done almost perfectly even if fluid contains reinforcing fillers such as glass fibers. The O-ring 6 opens elastically and is pressed strongly to the outside at the exit and on the other area is pressed to the recess 5d having the semi-circular cross section or the recess 5e having the square cross section. Accordingly the O-ring 6 does not fall off from the recess 5d having the semi-circular cross section or the recess 5e having the square cross section.

Incidentally, when the rubber packing 3 surrounds circumference of one end of the valve nut body 5 and is fused to it, there is no necessity to have washer 4 having inner gear 4a, which results in reduction of part number.

Next, a method to use the high pressure chemical solution pumping plug 1010 employing non-return bias valve mechanism according to the present invention will be explained with using FIG. 3.

Figure 3A:
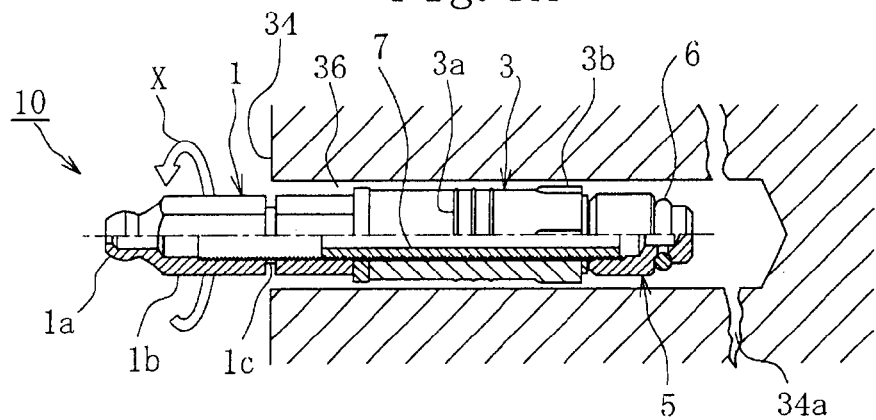
FIGS. 3A, 3B, 3C and 3D are schematic views each showing the repair steps of a crack generated in concrete wall using the chemical solution pumping plug of FIG. 1.

The high pressure chemical solution pumping plug 1010 is inserted in a hole 36 in a concrete wall 34 (Ref. FIG. 3A). Perpendicular protrusions 3b projecting horizontally on the periphery of the rubber packing 3 of the high pressure chemical solution pumping plug 1010 contact with the inserting hole 36 and plays a role of skid. A spanner or a wrench is attached to the nipple body 1 and the nipple body 1 is rotated to the direction of fastening. With that action the nipple body 1 moves on the screw pipe 7 to the direction of the valve nut body 5 and expands the rubber packing 3 like a barrel. As a result the outside surface of the rubber packing 3 and the pumping hole 36 contact firmly for each other.

Figure 3B:
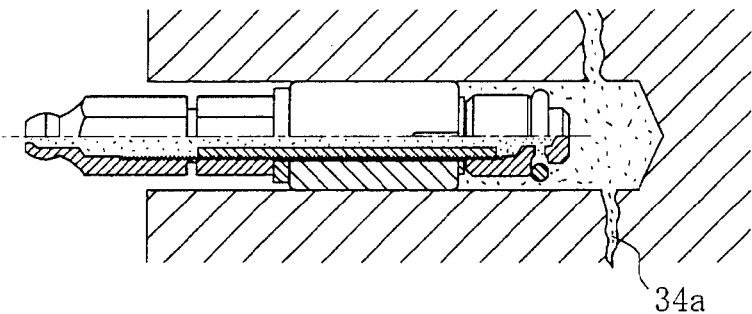

Nozzle of high pressure pump is mounted to the nipple head 1a which is the end of the high pressure chemical solution pumping plug 1010 and, then, sealing material, water proof agent, etc. is pumped at high pressure. (Ref. FIG. 3B) Fluid thus pumped reaches the perpendicular bore 5a and the radial hole(s) 5b of the valve nut body 5 through the screw pipe 7. Fluid running into the perpendicular bore 5a and the radial hole(s) 5b expands the O-ring 6 and is discharged outside of the high pressure chemical infusion plug 10 through the fluid passage 5c. Fluid from the high pressure chemical infusion plug 10 pours into crack 34a in concrete.

Figure 3C:
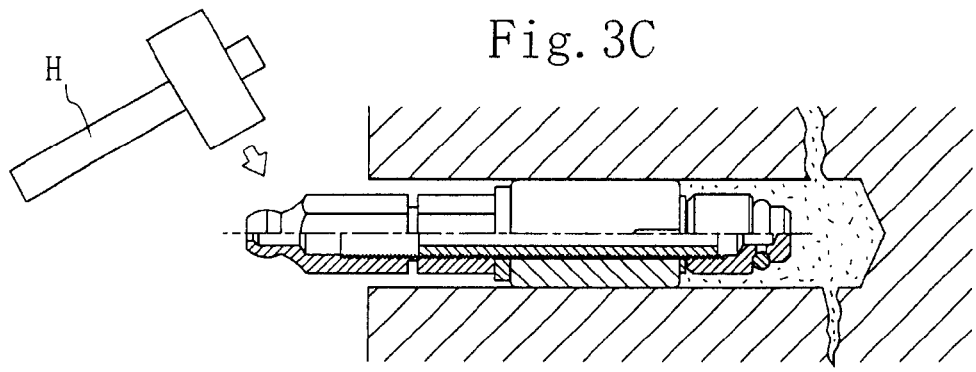
Figure 3D:
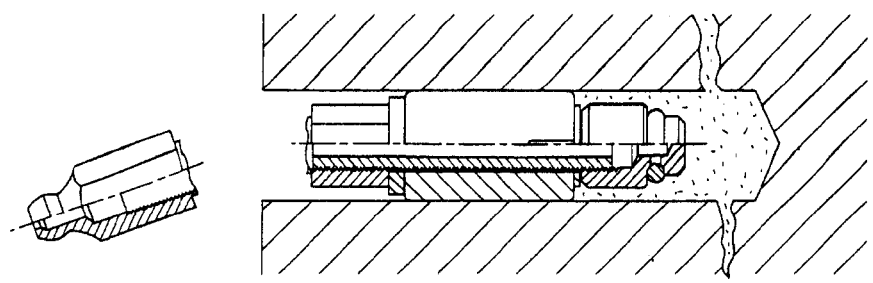

When pumping is done, the nozzle of the high pressure pump is removed. When it is removed, inside pressure of the high pressure chemical solution pumping plug 10 is lowered and the O-ring 6 closes the radial hole(s) 5b of the valve nut body 5 with high elasticity. Before chemical is cured and hardened (usually 5–40 hours) the nipple head 1a and the hexagonal nut 1b which is projecting from concrete surface is hammered down at the recess 1c. (Ref. FIG. 3C) Surface treatment is done to make it smooth.

As a result productivity is raised. Drawbacks (leakage, reverse flow, holding time before adhesive is cured, etc.) of high pressure pumping are resolved. Material such as fibrous reinforcing material can be used without problem and all chemicals can be used. Since infusion resistance is small, it can be used in delicate pumping at low pressure. Reuse is easily done and washing is possible. Besides, it is easy to manufacture a small diameter one.

In accordance with the invention described in claim 1 since the non-return bias valve mechanism comprises the main body having the perpendicular bore formed to the direction of axis and the radial hole extending from said perpendicular bore to circumference and outside and the ring shape sealing member made from elastic material such as rubber, etc. which can be opened and close the radial hole of the body, construction is quite simple and it can be manufactured at low cost. Besides, the main body and the ring shape sealing member seal easily with surface contact and since there is no hindrance inside the main body, sealing can be done almost perfectly even if fillers such as fibrous reinforcing material is contained.

In accordance with the invention the ring shape sealing member comprises the O-ring having the circular cross section and periphery including the location of radial hole of the body has the recess of semi-circular cross section where the O-ring is fitted, there is an effect to make production cost to a minimal extent.

In accordance with the present invention ring shape sealing member comprises the square cross section O-ring and the periphery including the location where radial hole of the main body is formed has the square cross sectional gap to which said O-ring is attached, contact surface between the body and the ring shape sealing member becomes large and as a result sealing gets more perfect.

In accordance with the present invention radial hole(s) of one or plural number makes a large amount of fluid to be discharged at the same time. Besides, although construction is simple, all radial hole(s)s can be closed surely.

In accordance with the present invention on the periphery of the main body since the fluid passage is formed which extends from the location of the radial hole(s) to the direction of axis, the O-ring is expanded and opened with fluid pressure discharged from the main body and further fluid runs smoothly through this passage.

Next, automatic fixing type plug for fluid pumping according to the third and fourth aspects of the present invention is explained in details on basis of embodiments as shown in figure.

FIG. 7 is a cross section view of an embodiment of an automatic fixing type plug for pumping fluid according to the fourth aspect of the present invention and 7A and 7B each shows the status before and after fluid is pumped.

As shown in FIG. 7A automatic fixing type plug 101 according to the present invention mainly comprises only two members, thus, an inner member 103 of metal or high strength plastic such as DERURIN resin and an elastic material which is mounted on the periphery of the inner member 103 and can slide in the axis direction of said inner member 103, for example, an outer sleeve 105 made of NBR rubber. Inner member 103 has perpendicularly directed center bore 103a and radially directed radial hole(s) 103b which is(are) connected with deep portion of the center bore. Female screw 103d is formed at the open side of the center bore 103a in order to attach nozzle 107 in water tight for pumping high pressure fluid. Cone surface 103d is provided on the periphery of the inner member 103 in a manner of reverse taper to the opening of center bore 103a.

On the other hand the outer sleeve 105 is made by injection molding. The outer sleeve 105 comprises a valve portion 105a which closes and opens radial hole(s) 103b of the inner member 103 and a cylindrical part 105b connecting therefrom.

Inner periphery of the cylindrical part 105b comprises cone inner surface 105c, which shape is complements to the reverse taper cone 103d of the inner member 103.

In a preferred embodiment, a plural of perpendicular protrusions 105d extending in the axis direction and a plural of ring protrusions extending around the periphery of the cylindrical part 105b of the outer sleeve 105. Friction strength is generated by the contact with the fluid pumping hole 136, which prevents outer sleeve 105 from sliding against the fluid pumping hole 136.

As for the material of the inner member 103 and the outer sleeve 105, it is selected to make friction strength between said outer sleeve 105 and the inner member 103 smaller to the determined extent than that between the fluid pumping hole 136 and said outer sleeve 105 of the structure body. The angle of the inner member 103 to the axis of reverse taper type cone 103d which is complementary to the inner cone 105c of the outer sleeve 105 is 3–10 degrees. In case when the inner member 103 is made of DERURIN resin and the outer sleeve 105 is made of NBR rubber, since the friction strength between the outer sleeve 105 and the inner member 103 is smaller than that between the outer sleeve 105 and the fluid pumping hole 136, when they contact a little within this range, the inner member 103 slides on the outer sleeve 105 to the axially outward direction. With the above cone 103d of the inner member 103 pushes and expands the outer sleeve 105 to radically outward direction, which makes the outer sleeve 105 and the inner surface of the fluid pumping hole 136 contact in tight. (Ref. FIG. 7B) The angle varies depending upon the materials to be used.

Valve 105a of the outer sleeve 105 is provided therearound to cover and close the radial hole(s) 103b of the inner member 103. Accordingly when high pressure above 40 MPa is applied, there is no problem in performances. Further, the inner member 103 and the valve 105a of the outer sleeve 105 seal easily with surface contact and since the center bore 103a and the radial hole(s) 103b of the inner member 103 do not have any hindrance, it is possible to seal almost completely even if fillers such as fibrous reinforcing material are included.

In the embodiment of the present invention shown in FIGS. 8 and 9 the elastic valve 109 in place of valve 105a which closes and opens radial hole(s) 103b of the inner member 103 is provided, which is a different point from FIG. 7. Inner member 103 is, as described previously, made of such material as high strength engineering plastic and can stand high pressure pumping. Incidentally the automatic fixing type plug 101 for fluid pumping is not reusable but disposal and is buried in the pumping hole 136. If the inner member 103 is made of non metallic material, it protects the automatic fixing type plug 101 from rust or chemical reaction and structure 134 where the plug 101 is buried is kept off from deterioration. When this automatic fixing type plug 101 for fluid pumping is used for road repair, negative effects arising from bad road conditions to tires of automobiles such as flat tires become minimal.

Radial hole(s) 103b of the inner member 103 can be one or more. The periphery including the place where the radial hole(s) 103b of the inner member 103 is made has square recess 103e or semi-circular cross sectional recess 103f to which the O-ring 109 having square cross section or circular cross section is attached. Fluid coming through the center bore 103a and the radial hole(s) 103b at high pressure is discharged into the fluid pumping hole 136 after it expands the O-ring 109 and forms passage.

In a preferred embodiment, as a ring shape sealing member having elasticity which can open or close the radial hole(s) 103b of the inner member 103, square cross sectional (shown in FIG. 8) or circular cross sectional O-ring is used. O-rings of other cross sections can be used, of course. For example, oval ones, triangle ones, etc. In such cases the shape of recess where the O-ring is attached should be revised to be oval, triangle, etc. accordingly.

O-ring 109 surface contacts with the surfaces of the recess 103e or 103f which is formed on the periphery including the location of the radial hole(s) 103b of the inner member 103. With the above sealing between the inner member 103 and the O-ring 109 can be done almost perfectly though the construction is simple. In addition since sealing is done with surface contact not with line contact, sealing is done almost completely even if fillers such as fibrous reinforcing material, etc. is included. O-ring 109 is rubber or metal and opens elastically. In case of metal O-ring it needs a gap or a cut, which must be off set from the location of the radial hole(s) 103b of the inner member 103. This metal type one needs to be extended of center angle having above 180 inclinations and below 360 inclinations. In case the O-ring 109 is made of rubber, it should be a ring type one having no gap or cut. With the above mentioned arrangement the O-ring 109 is fitted to the recess 103e or 103f of the inner member 103 and does not fall off.

Valve part 109 mentioned in the above, while it is simply constructed, can surely close and open the radial hole(s) 103b of the inner member 103. Since it has a simple construction, the outer diameter of the automatic fixing type plug 101 can be small (possible to down size). Since elasticity and strength of valve part 109 can be changed freely, there is no functional problem when high pressure fluid of above 40 MPa is used.

FIG. 10 is a cross section view of an another embodiment of an automatic fixing type plug for fluid pumping according to the present invention and FIGS. 10A and 10B respectively show the status before and after fluid is pumped.

In the preferred embodiment shown in figures the reverse taper type cone 103d of the inner member 103 and the inner cone 105c of the outer sleeve 105 which are made in the axis direction in two or more. At the plural locations in the axis direction the inner member 103 expands the outer sleeve 105 to the radically outside and, therefore, the outer sleeve 105 and the inside surface of the fluid pumping hole 136 contact tight. As a result the possibility of leaking of fluid from the fluid pumping hole 136 becomes minimal to the possible extent.

Incidentally, the other end of nozzle 107 can be connected in watertight with, for instance, the high pressure pump or hose extending therefrom via pumping coupling or chuck.

Next, a method for using the automatic fixing type plug 101 will be explained as follows.

Automatic fixing type plug 101 can be used as a joint packer, which is used in repair of tiling of concrete structures as an example. Fluid pumping hole 136 is drilled at the place where joint cross of tiles which constitute the concrete wall 134 and the automatic fixing type plug 101 is inserted into each of the fluid pumping holes 136.

Perpendicular protrusions 105d or ring type protrusions 105e of the axis direction which are protruded laterally on the periphery of the outer sleeve 105 of the automatic fixing type plug 101 contact with the fluid pumping hole 136 and friction strength prevents the outer sleeve 105 from sliding in the axis direction against the fluid pumping hole 136. Under said condition adhesive or waterproof agent is pumped at high pressure into the automatic fixing type plug 101 from the high pressure pump nozzle 107. Fluid thus pumped passes the center bore 103a and the radial hole(s) 103b of the inner member 103 by means of the nozzle 107. Fluid coming into the radial hole(s) 103b opens the valve part 105a (FIG. 7) or the O-ring 109 (FIG. 8 or FIG. 9) and is discharged outside of the automatic fixing type plug 101, namely to the inside of the fluid pumping hole 136. High pressure fluid thus discharged to the inside of the fluid pumping hole 136 goes deep inside the concrete gap 134a.

In the preferred embodiment of FIG. 7, the high pressure fluid pushes the valve part 105a of the outer sleeve 105 to the outside, which is pressed on the inside surface of the fluid pumping hole 136 to be fixed thereto. On the other hand in the preferred embodiment in FIGS. 8 and 9, a little friction strength between perpendicular protrusions 105d of the axis direction and/or the ring protrusions 105e protruded laterally on the periphery of the outer sleeve 105 and the fluid pumping hole 136 keeps the outer sleeve 105 fixed to the fluid pumping hole 136. Accordingly the material of the inner member 103 and the outer sleeve 105 or the angle of the cone 103d should be selected within the determined limit so that the inner member 103 only slides to the direction of center bore opening 103a relative to the outer sleeve 105 which is stopped. Thus, the inner member 103 slides to the direction of axis while the cone 103d, which constitutes reverse taper to the opening of center bore made on the outer surface thereof, pushes the inner cone 105c complementary to the outer sleeve 105 to the outside. With the above arrangement, the outer sleeve 105 is expanded to the radial direction, and the outer sleeve 105 and the inside surface of the fluid pumping hole 136 is fixed tight for each other.

When pumping is completed, the nozzle is rotated in an unfastening direction and removed. When it is removed, inside pressure of the automatic fixing type plug 101 is lowered and the valve 105a or the O-ring 109 closes the radial hole(s) 103b of the inner member 103 with high elasticity. Without waiting for fluid to be cured or hardened (normally 5–40 hours), the fluid pumping hole 136 is closed with surface material and surface is treated so that it becomes flat. In a conventional method, the nipple head should be hammered down, there is no necessity to do so in the present invention.

As a result productivity is enhanced, adverse effects related with high pressure pumping are solved (leakage, reverse flow, curing time of adhesive, etc.) and any chemical containing fibrous reinforcing material can be used without any problem. In addition since pumping resistance is small, delicate pumping at low pressure can be done and it can be used for repair of paving of roads. Besides, a small diameter one can be made easily. There are benefits of any and all above and a combination of the above.

In accordance with the invention an inner member has a center bore made in the axis direction and radial hole(s) extending from said bore to outside and the outer surface is cone shape of reverse taper to the opening of center bore with a mechanism to have pumping member of fluid into said center hole and hold water proof. Outer sleeve is mounted on the periphery of inner member so that it may slide in the axis direction of said inner member and has valve which opens and closes radial hole(s) of inner member and inner cone surface which supplements cone surface of reverse taper of inner member. Outer sleeve has a small elasticity so that friction strength between outer sleeve and inner member is smaller than that between fluid pumping hole of a structure and outer sleeve and there is no necessity to rotate nipple or break nipple head out of concrete with a hammer and it is fixed tight inside fluid pumping hole automatically.

Besides, plug does not fall off from hole even if fluid is pumped at high pressure and a job is done safely and within a short period. Construction of automatic fixing type plug is simple and it is made at low cost.

In accordance with the invention in place of valve of outer sleeve, valve material such as elastic O-ring which opens and closes radial hole(s) of inner member is used and it can be used at high pressure, long life non-return bias valve mechanism is simply and at low cost produced and further it can be downsized.

In accordance with the present invention since valve material for sealing radial hole(s) of inner member is metallic ring shape sealing member having elasticity and one cut portion or rubber made ring shape sealing member which is seamless, it can close and open radial hole(s) of inner member completely with a simple mechanism. As it has a simple mechanism, it can have a small diameter. Strength can be varied and accordingly there is a benefit high pressure fluid of above 40 MPa is used without any problem.

In accordance with the present invention since reverse taper cone surface of inner member and inner surface cone of outer sleeve which supplements the former are formed in plural of two and more in the axis direction, inner member expands outer sleeve to the periphery side at such locations in the axis direction and outer sleeve and inside surface of fluid pumping hole are fixed tight.

In accordance with the present invention since the angle between reverse taper cone and the axis of inner cone surface of outer sleeve which supplements the former is 3–10 inclinations, when outer sleeve touches fluid pumping hole slightly, friction strength between outer sleeve and inner member is smaller than the former's friction strength, inner member can be slided against outer sleeve in the axis direction side. As a result outer sleeve is expanded to the periphery side and outer sleeve and inner side of fluid pumping hole can be fixed tight.

In accordance with the present invention inner member is made of non metallic material such as engineering plastic and there is a benefit that it prevents automatic fixing type plug from rust or chemical reactions and further protects structures where it is buried. In addition, when automatic fixing type plug for fluid pumping is used for road repair, negative effect against tires becomes minimal.

Figure 13A:
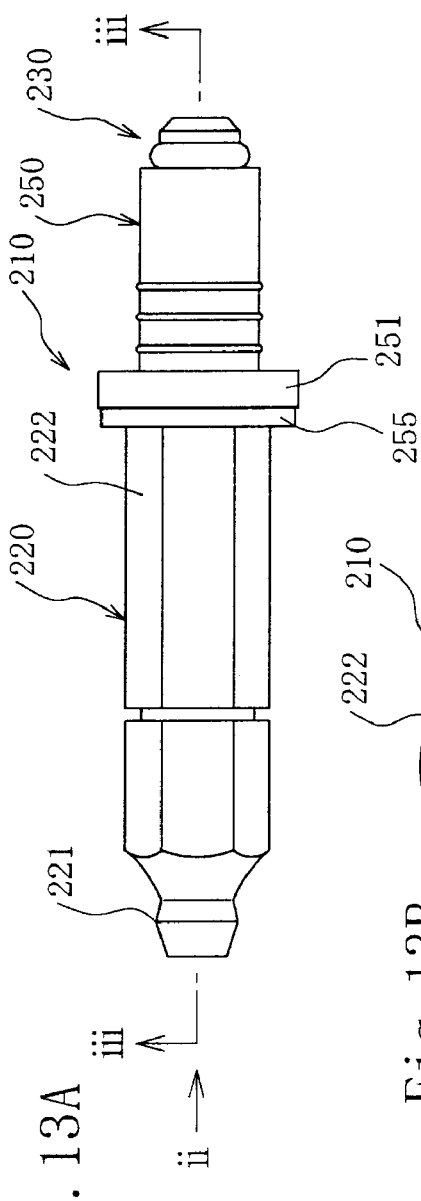
FIG. 13A is a front view showing the chemical solution pumping plug body of FIG. 12.
Figure 13B:
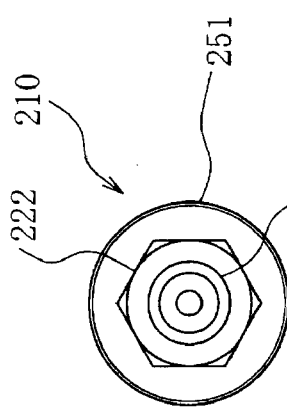
FIG. 13B is a side view of 13A from direction ii and 13C is a cross section view taking along line iii—iii in FIG. 13A.
Figure 13C:
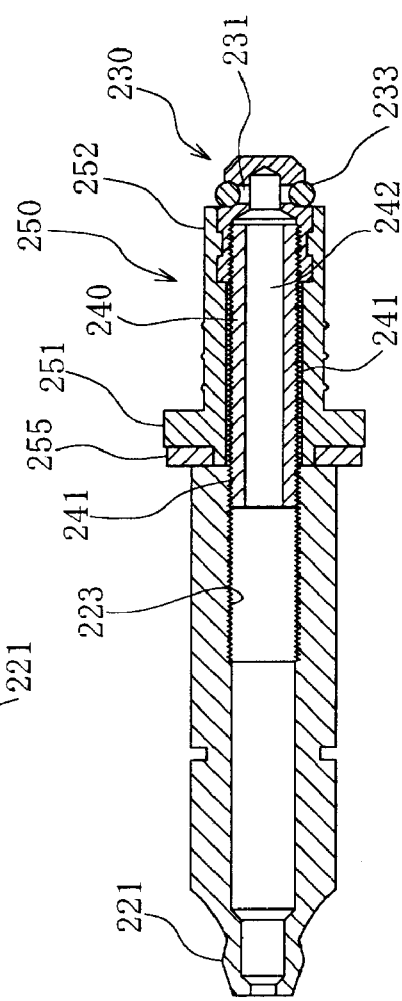
Figure 14A:
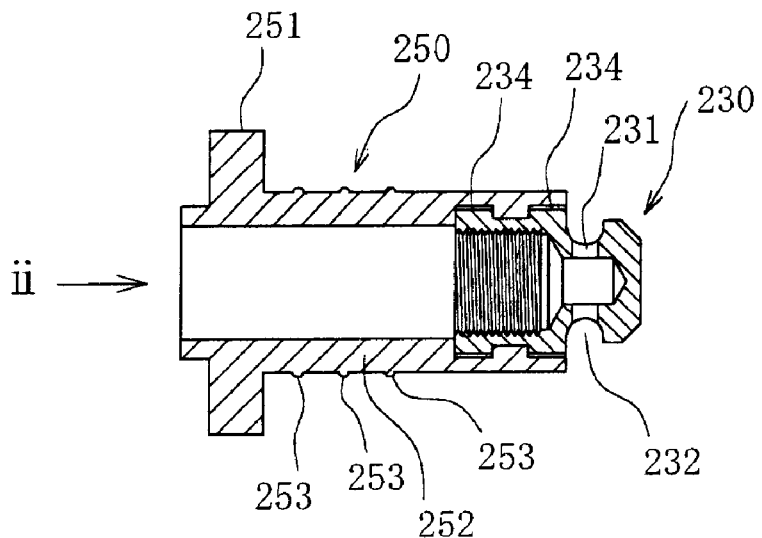
FIG. 14A is an enlarged longitudinal cross section view showing the sleeve and the non-return bias valve of the chemicals pumping plug shown in FIG. 12
Figure 14B:
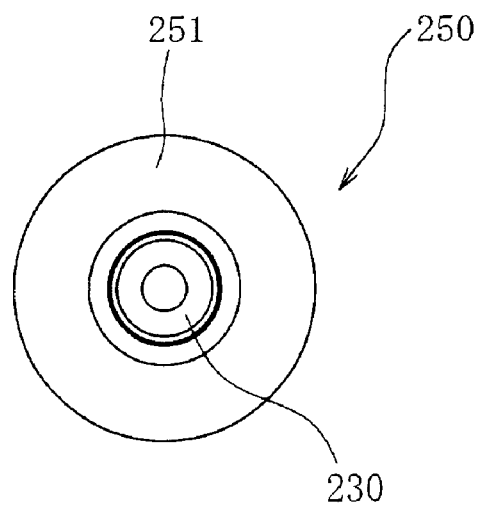
FIG. 14B is a side view from direction ii in FIG. 14A.

The fifth and sixth characteristic of the present invention is explained using figures. FIG. 12–FIG. 14 show chemical solution pumping member according to the fifth aspect of the present invention and the first embodiment of chemical solution pumping method utilizing the above.

In this embodiment chemical solution pumping member 210 comprises nipple 220 for chemical solution pumping from outside, non-return bias valve which is located at hole 203 made at the opposite side of nipple 220 and inside the structure for repair 201, connecting cylindrical member 240 between nipple 220 and non-return bias valve 230 by moving said nipple 220 and elastic material. It further comprises flange member 251 which covers said connecting cylinder 240 and contacts with the outside of said reinforcing plate material 202 and sleeve member 250 which covers around said connecting cylinder 240 and can be inserted to the opening (for example 10 mm in diameter) of said reinforcing plate 202 at usual time and pinch member 252 is made to pinch reinforcing material with said flange 251, when said nipple 220 is moved.

In this embodiment the specification of head portion 221 of nipple 220 is that for automotive grease under ISO Specifications and grease injector available in general markets can be used. The side next to head has hexagonal TAIHEN where rotating tool is fixed and is rotated easily. Further inside of the head female screw 223 is made, screwed into female screw 241 made on said connecting cylinder 240 and connects nipple 220 and said non-return bias valve 230 at variable distance by rotating said nipple 220.

Said non-return bias valve 230 has, as shown in FIG. 14, opening 231 on the edge and around this opening 231 circular recess 232 of OU shape is formed and by inserting rubber ring 233 into such circular recess non-return bias valve is made. As a result it can be used for adhesive containing slurry and can be disassembled for reuse.

Further in this embodiment, non-return bias valve 230 is screwed and fixed to said connecting cylinder 240 and on the periphery stopping step 234 is formed, which is stopped at the end of inside of said sleeve 250 and fixed there.

Besides, chemical passage 242 (for example 2 mm in diameter) is formed on connecting cylinder 240 and on the periphery said male screw 241 is made.

Sleeve body 250 is made of elastmer like rubber and flange portion 251 is located vertically to the axis of plug body 210. Incidentally, mark 255 in FIG. 13 shows metal washer. Besides, around the area of pinching portion 252 3 lines of circular protrusion are made and attached tight to the inside of a hole of reinforcing plate 202. In the above case it is preferable that inside surface of sleeve body 250 does not attach firmly to said connecting cylinder 240.

In order to pump chemicals by using chemical solution pumping valve 210 as shown in FIG. 12 reinforcing plate 202 made of iron is located around the concrete structure 201 where hole 203 is made. In this case it is better to have opening 204 in advance on reinforcing plate 202 corresponding hole 203 of concrete structure 201.

Figure 12A:
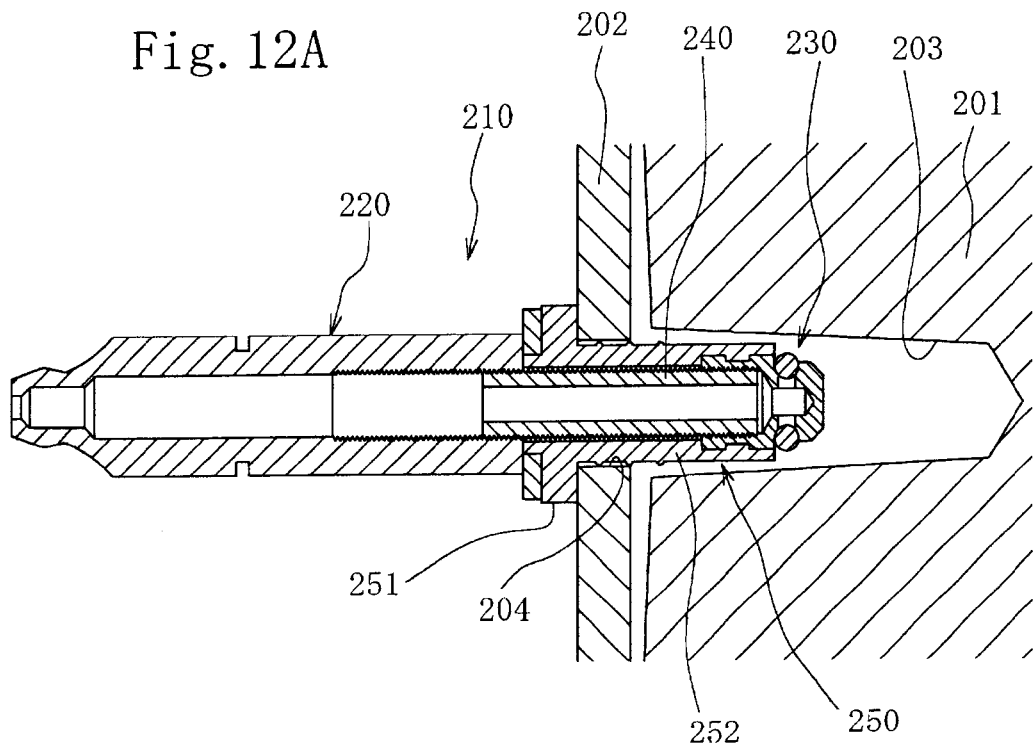
FIGS. 12A and 12B are longitudinal cross section views each showing an embodiment of pumping plug body for chemicals to explain a chemical solution pumping method using the plug according to the fifth aspect of the present invention.

Next as shown in FIG. 12A chemical solution pumping plug 210 is inserted into opening 204 of reinforcing plate 202. Then, while flange member 251 of sleeve body 250 is attached firmly to the surface of reinforcing plate 202, electric rotating tool is attached with hexagonal TAIHEN 22 of plug body 220, which is rotated to move connecting cylinder 240 to inside.

Figure 12B:
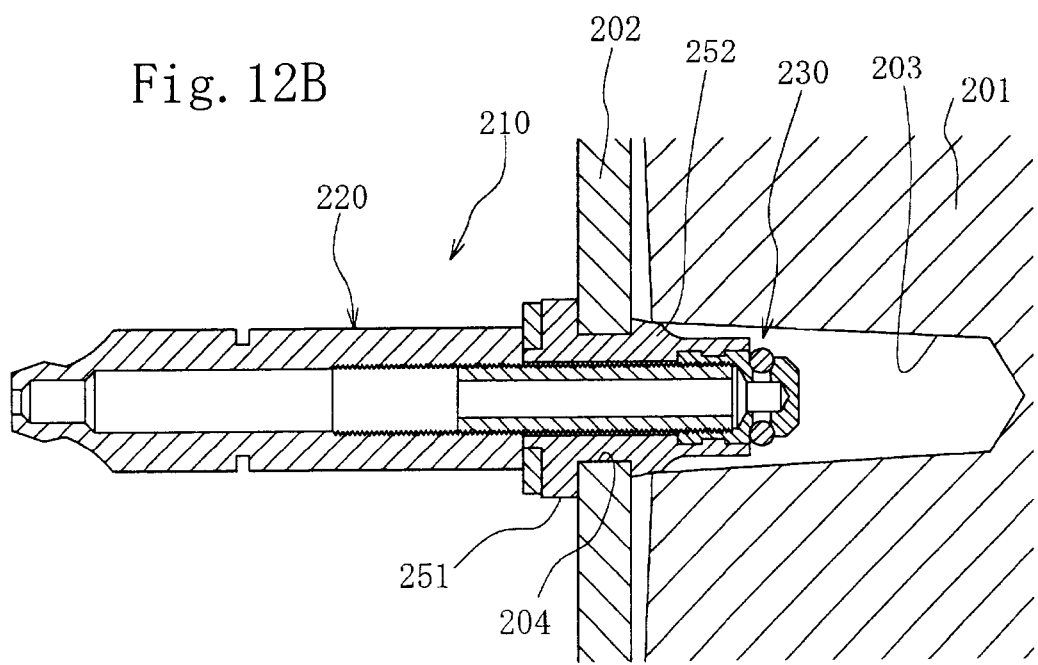

Then sleeve body 252 is exploded outside as shown in FIG. 12B and pinches said flange material 251 and said reinforcing plate 202 firmly and strongly. In this stage chemical is pumped.

In an experiment of the applicant the following result was obtained under the conditions of opening diameter of reinforcing plate 10 mm, inside diameter of connecting cylinder 2 mm, rubber hardness of sleeve body 80, diameter of flange material 16 mm, and winding torque 1 Nm. In the meantime, figures in parenthesis shows the values of conventional ones for reference.

Pumping pressure: no leakage at 25 Mp (leakage at 8 Mp)
Non-return bias valve pressure: no leakage at 10 MPa (leakage at 0.5 Mp)
Pumping volume: above 200 cc/minute, viscosity 5 hundred thousand CP (50 cc/min)
Reuse: It can be disassembled and washed for reuse, while it is different depending upon the adhesives and application methods. (not possible to disassemble)

Accordingly, the present invention is proved to be superior to any conventional products.

Figure 15:
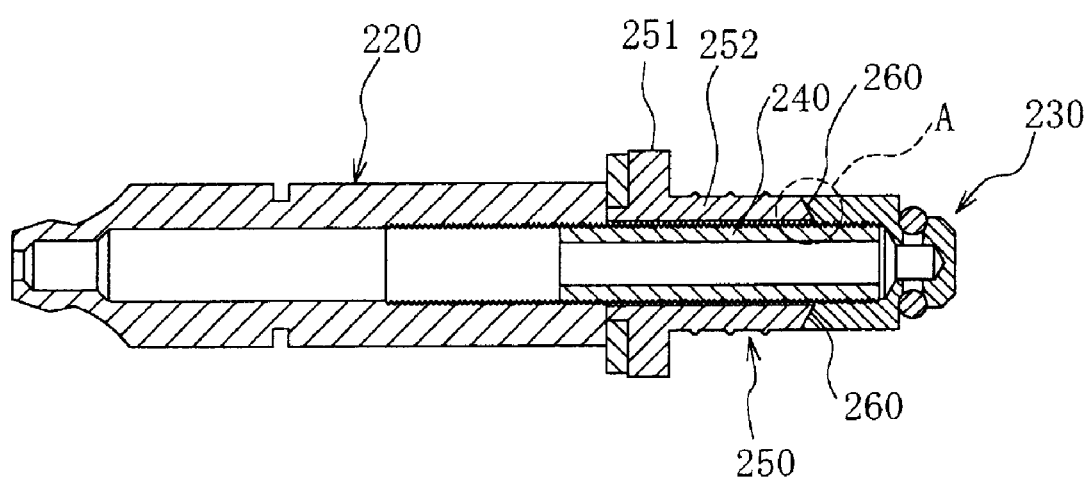
FIG. 15 is a longitudinal cross section view of another embodiment of the chemical solution pumping plug body according to the fifth aspect of the present invention.
Figure 16A:
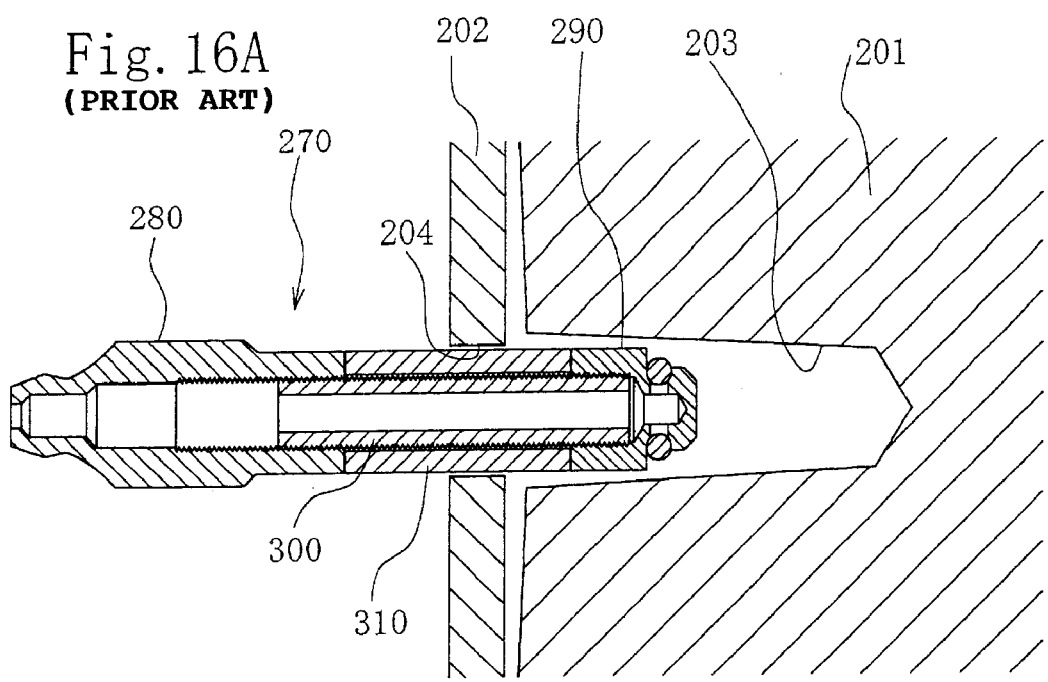
FIGS. 16A and 16B are longitudinal cross section views each showing a conventional plug body for chemical solution pumping and chemical solution pumping method utilizing the conventional plug.
Figure 16B:
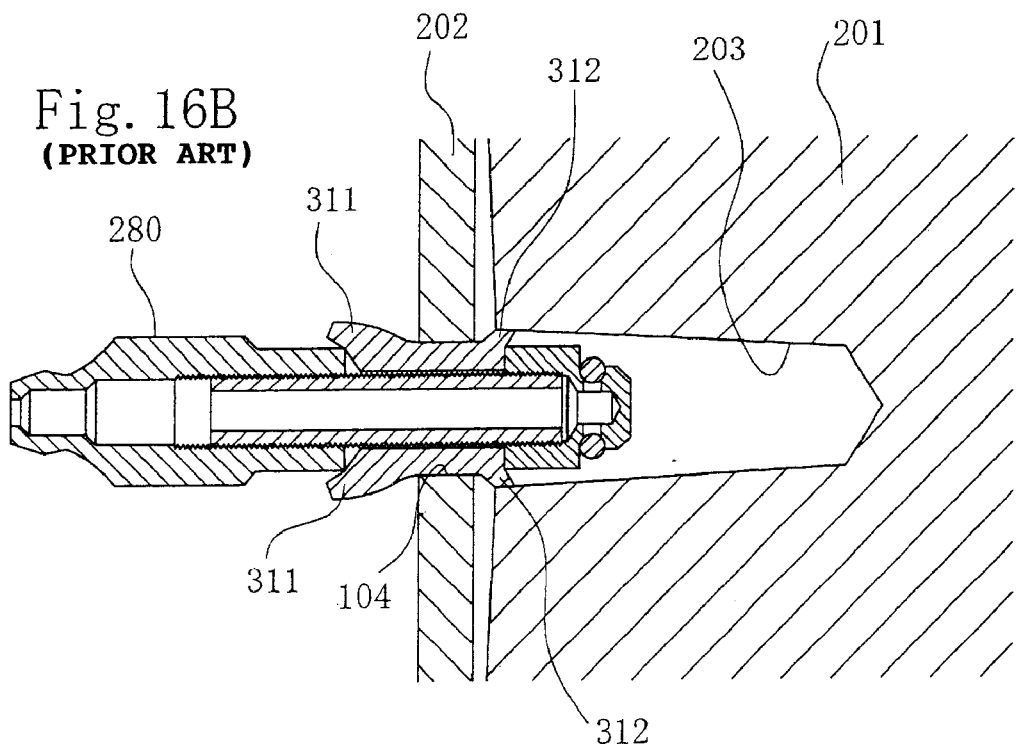

FIG. 15 is a cross section view of chemical solution pumping plug of another embodiment according to the present invention.

In this embodiment as A shows in figure except reverse taper portion 260 is formed at the contact portion of non-return bias valve 230 and sleeve body 250 the constitution is same as in the first embodiment and same member has same mark and detailed explanation is not made.

In this embodiment also reinforcing plate is tightened between flange member sufficiently without expansion of the edge of sleeve when sleeve is tightened.

In the present invention sleeve body can pinch reinforcing member tightly and firmly between flange member and pumping plug is attached vertically to reinforcing plate. As a result there is a benefit that no leakage occurs.

In accordance with the present invention since pumping plug member has non-return bias valve, there is a merit that chemicals do not flow backward. In case valve is made of rubber, it is possible to disassemble and reuse can be done. Besides, reverse taper is formed between non-return bias valve and sleeve body, the edge of sleeve body does not expand.

In accordance with the present invention since nipple member is only rotated in use, there is no necessity to use a special tooling to attach pumping plug to reinforcing plate. Further, it is possible to make hexagonal TAIHEN on nipple member and tightening can be done easily in this case.

In accordance with the present invention as the structure has a hole where the edge of pumping plug is inserted, there is a good effect of attaching pumping plug and pumping chemicals even if the distance between the structure and reinforcing plate is small.

Next, high pressure pumping instrument for fragile structure related with the seventh characteristic of the present invention and high pressure pumping method for fragile structure related with the eighth characteristic of the present invention is explained in details using embodiment shown in figure.

Figure 17:
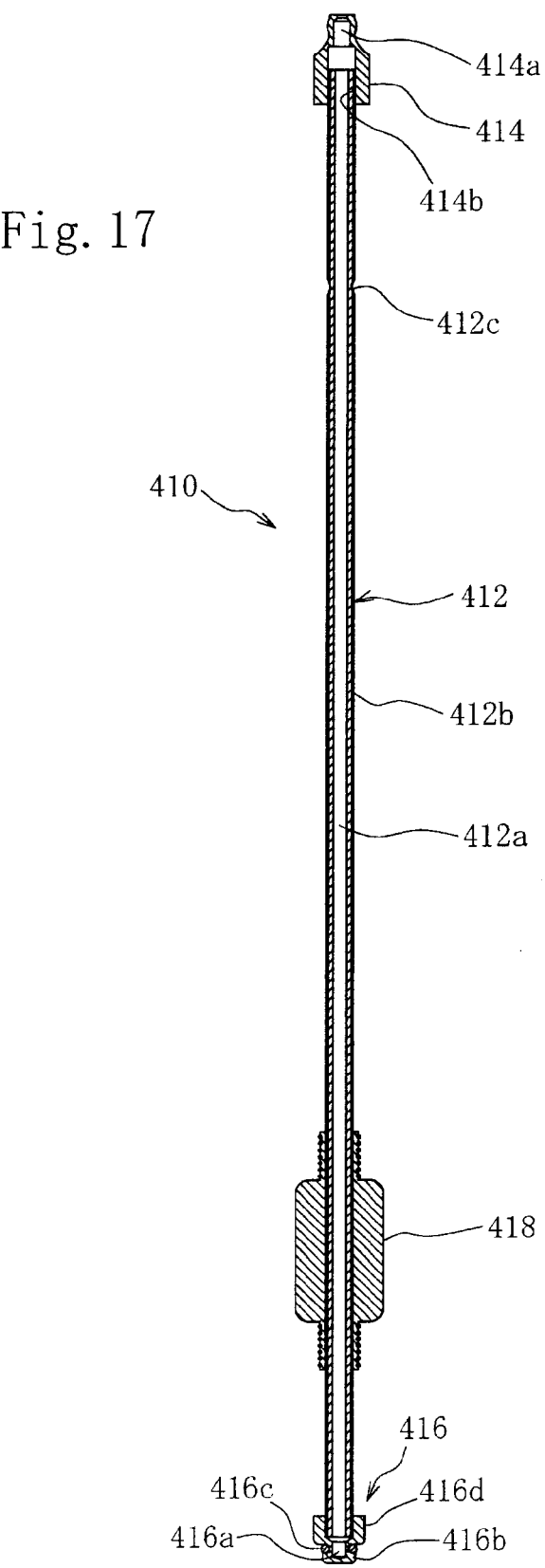
FIG. 17 is a longitudinal cross section view of an embodiment of a high pressure pumping instrument according to the seventh aspect of the present invention.

FIG. 17 is a longitudinal cross section view of high pressure pumping instrument for fragile structure related with the present invention.

As shown in FIG. 17 high pressure pumping instrument 410 mainly comprises pipe member with small diameter 412, nipple member 414 which is fixed to the edge of pipe member 412, non-return bias valve 416 which is attached to the other end of pipe member 412 as a separate member and sponge member 418 which is attached to the middle of the periphery of pipe member 412.

Pipe member 412 is made of metal. It has a certain mechanical strength in order to play a role of anchor. On the whole surface of pipe member 412 male screw 412b is formed because of a reason mentioned later. Besides, pipe member 412 has a center hole 412a which runs through in the axis direction. Outside diameter of pipe member 412 is smaller than inside diameter of chemical solution pumping hole 401. Neck portion 412c is formed at the determined length from the place where nipple member 414 of pipe member 412 is attached. After adhesive is pumped by inserting high pressure pumping instrument 410 of the present invention to chemical solution pumping hole 401, nipple member 414 is beaten with a hammer or other beating tool. The external portion from neck portion 412c can be easily broken and separated from the remaining portion inside chemical solution pumping hole 401.

Nipple member 414 is attached to, but can be removed again from, chemical solution pumping coupling of chemical solution pump. In a preferred embodiment shown in figure female screw 414b inside center hole 414a is screwed into and attached to male screw 412b of pipe member 412.

Non-return bias valve 416 is attached as a separate member to the lower edge of pipe member 412. This non-return bias valve can employ various types of non-return bias valve mechanism, however, in a preferred embodiment shown O-ring type which can be made at low cost and downsized is employed. Namely, non-return bias valve 416 comprises O-ring 416c which closes elastically center hole 416a extending in the axis direction and at least one radial hole(s) 416b extending radically from the inside of said center hole 416a to outside and outside opening of radial hole(s) 416b and hexagonal nut face 416d made on the periphery of non-return bias valve 416 which rotates non-return bias valve 416 against pipe member 412 and is connected with a rotating tool such as a spanner which is not shown in figure.

Figure 18:
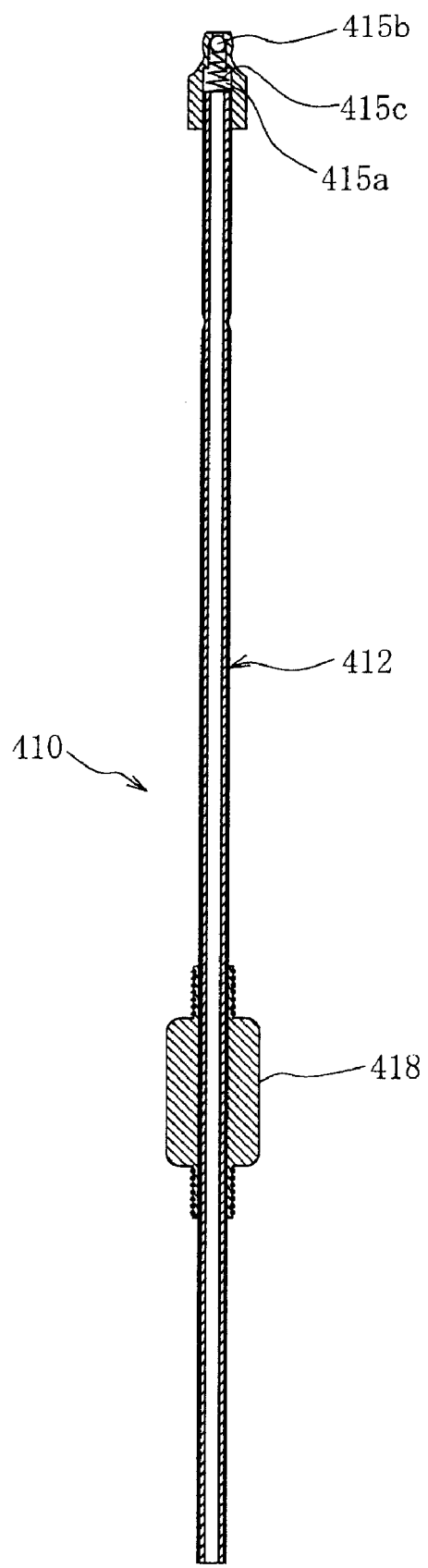
FIG. 18 is a longitudinal cross section view of another embodiment of the high pressure pumping instrument according to the seventh aspect of the present invention.

With this non-return bias valve 416 reverse flow of chemicals pumped deeply inside chemical solution pumping hole 401 through center hole 412a of pipe member 412 is prevented. Non-return bias valve mechanism can be installed inside nipple member 414 as shown in another embodiment. Grease nipple which is already known to public can be used and is available at low cost. As shown in FIG. 18 nipple member 415 related with the embodiment has ball 415b around the inlet of center hole 415a, which is pressed against the mouth with spring 415c and reverse flow of chemical is prevented. In this case there is no need to install non-return bias valve 416 to the lower portion of pipe member 412 as shown in FIG. 17.

Sponge material 418 preferably is of independent bubble type so that it may not be corroded with chemicals. Outside diameter of sponge material 418 is larger than inside diameter of chemical solution pumping hole 401 under normal conditions. However, when high pressure pumping instrument 410 is inserted into chemical solution pumping hole 401, it easily shrinks and becomes smaller than inside diameter of chemical solution pumping hole 401, which enables to insert high pressure pumping instrument 410 into chemical solution pumping hole 401 with a little strength. In spite of the above when fixing agent is pumped between chemical solution pumping hole 401 and high pressure pumping instrument 410 it stops fixing agent to flow inside of chemical solution pumping hole 401 over sponge material 418.

Fixing agent tends to shrink when curing occurs and if male screw 412b is made around the whole periphery of pipe member 412, bonding between pipe member 412 and fixing agent becomes strong and falling off does not happen. Sponge material 418 is fixed to the periphery of pipe member 412 in various ways. In a preferred embodiment shown sponge material 418 is fixed to pipe member 412 with both ends fastened with strings.

Figure 19:
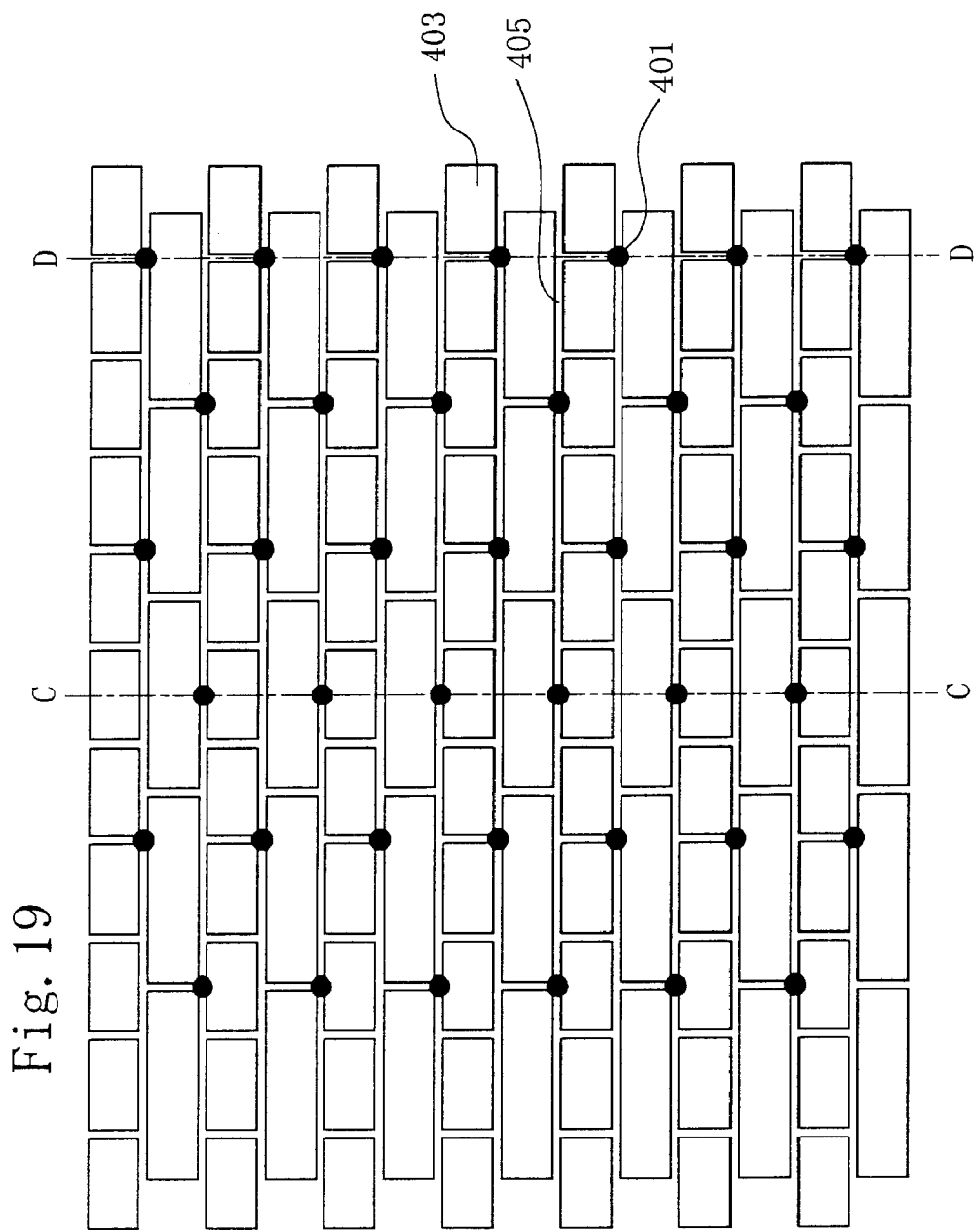
FIG. 19 is a front view showing the location of hole 401 for chemical solution pumping when the high pressure pumping method for a fragile structure is applied to a brick wall according to the present invention.
Figure 20:
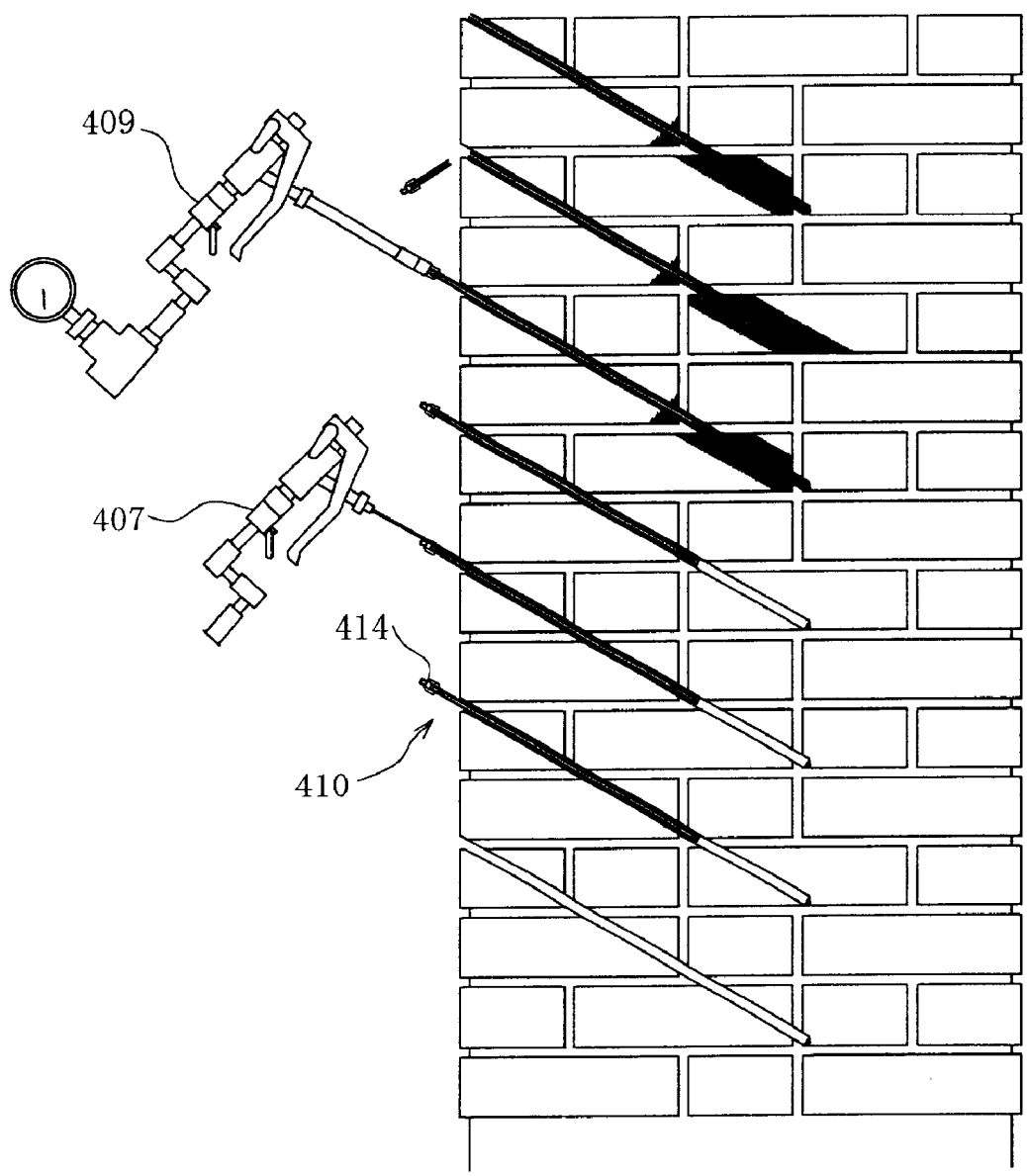
FIG. 20 is a longitudinal cross section on line B—B in FIG. 19.
Figure 21:
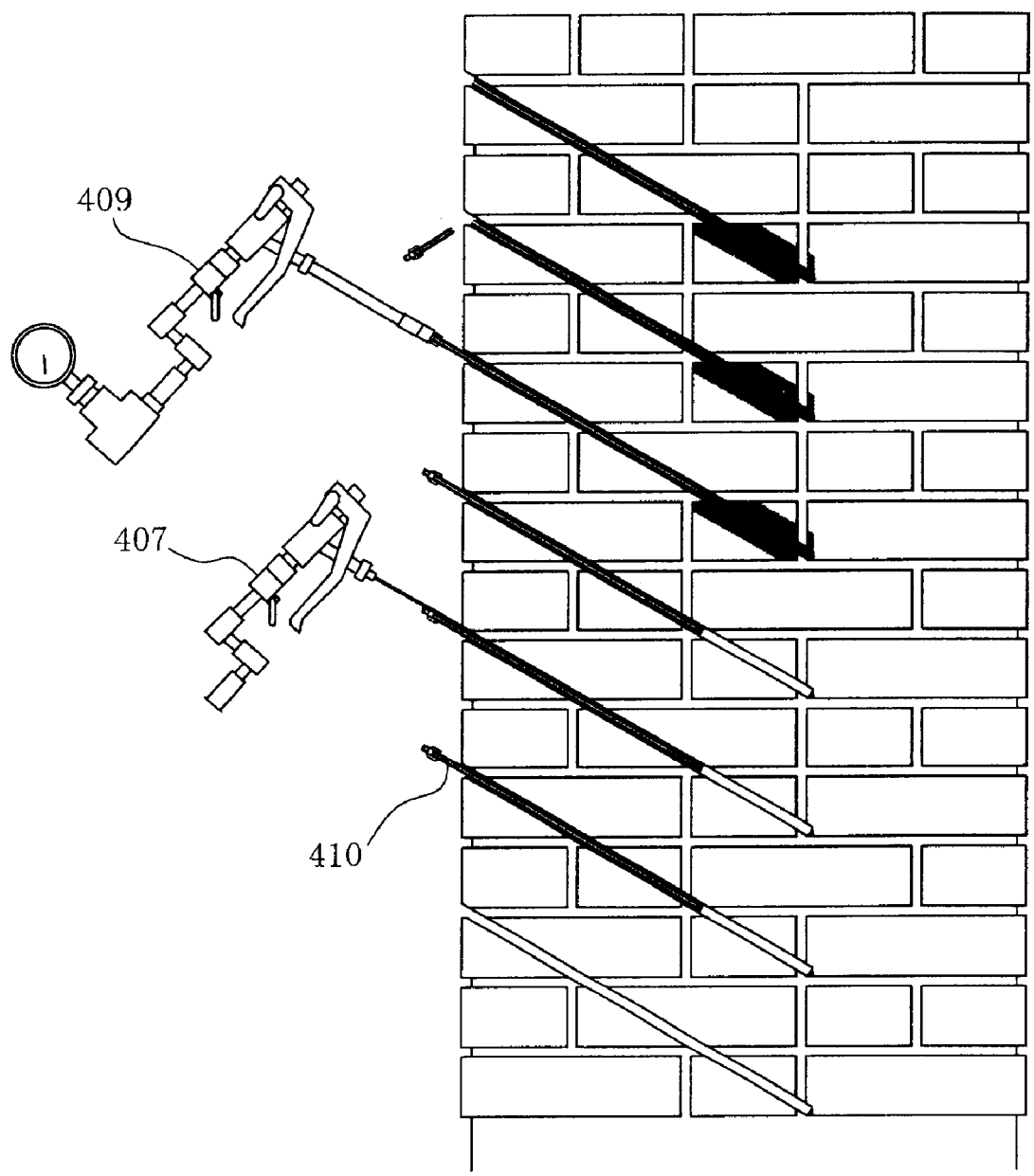
FIG. 21 is a longitudinal cross section on line C—C in FIG. 19.

Next, high pressure pumping method for fragile structures using high pressure pumping instrument 410 according to the seventh aspect of the present invention is explained, referring to FIG. 19–FIG. 21.

FIG. 19 is to explain the location of chemical solution pumping hole 401 in a front view when high pressure pumping method for fragile structures according to the present invention is applied for brick wall.

Usually bricks 403 as shown are piled so that joint of bricks are not in line. Chemical solution pumping hole 401 is drilled in plural numbers on joint with equal distance between the holes. FIG. 20 is a vertical cross section on line AA and FIG. 21 is a vertical cross section on line CC. When vertically viewed chemical solution pumping hole 401 made in line with line BB is formed at one brick of 403 below in comparison to chemical solution pumping hole 401 made in line with line CC. Besides, as shown in FIG. 20 and FIG. 21 chemical solution pumping hole 401 is made at descending slope of 15–45 inclinations to the inside of brick wall, preferably 23–37 inclination descending slope. Chemical solution pumping hole 401 being 30–50 cm in length, several layers of bricks are drilled with this range of angle and anchor effect is high. Besides, adhesives permeate in joint 405 of several layers and brick 403 and combine them tight and effectively.

Next, using FIG. 20 high pressure pumping method for fragile structures related with the eighth characteristic of the present invention is explained.

Figure 22:
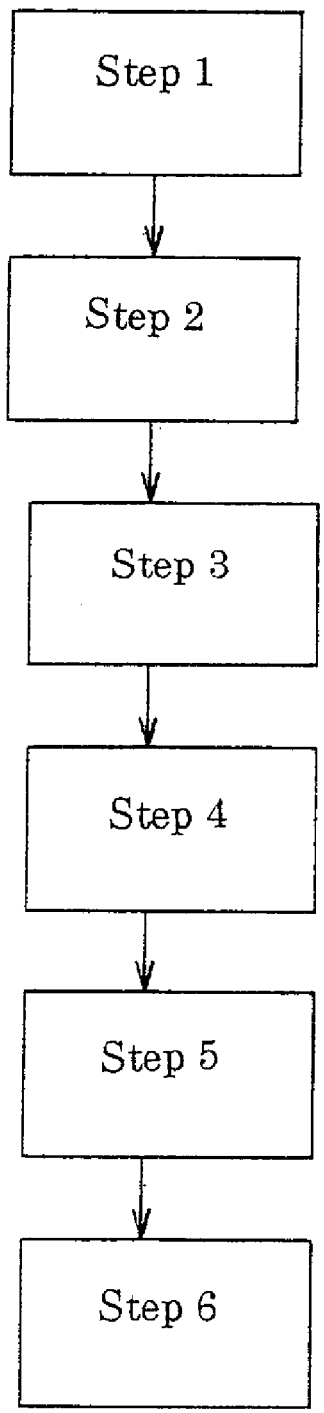
FIG. 22 is a flow chart of an embodiment of the high pressure pumping method for a fragile structure according to the eighth aspect of the present invention.

High pressure pumping method for fragile structures according to the present invention mainly consists, as shown in FIG. 22, of Step 1, drilling of numerous chemical solution pumping holes, Step 2, insertion of high pressure pumping instrument 410 to inside of chemical solution pumping hole 401, Step 3, fixing agent pumping, Step 4, high pressure pumping of fixing agent and Step 5, breaking of nipple side portion 414.

In Step 1, drilling of numerous chemical solution pumping holes, many chemical solution pumping holes 401 are drilled at equal distance locations, as shown in FIG. 19, with an electric drilling machine not shown in figure. Chemical solution pumping hole 401 is drilled deep enough to reach a half or three-fifths of width of brick of the repair portion of the structure. Besides, width of joint 405 is usually in the range of 2–15 mm. Accordingly, when mechanical strength as a packer of high pressure pumping instrument 410 is considered, it is assumed 10 mm diameter one is considered best. Approximately 30 inclination angle against horizontal line is best for job efficiency.

In this embodiment job is done continuously from lower chemical holes 401 to upper ones. Therefore, high pressure pumping instrument 410 was used as shown in FIG. 17 and nipple member 414 is not connected with the end of pipe member 412. In Step 2, insertion of high pressure pumping instrument to chemical solution pumping hole, high pressure pumping instrument is inserted into many chemical solution pumping holes 401. High pressure pumping instrument 410 is inserted deep enough to reach about a half of brick width of the repair portion of the structure.

In Step 3, pumping of fixing agent using pumping pump 407 with small nozzle 407a fixing agent is pumped between chemical solution pumping holes 401 and high pressure pumping instrument 410. The pumping pump 407 does not have to be of high pressure. As fixing agent same material as adhesive can be used, however, if job efficiency is focussed, the one having fast curing speed is preferable.

When fixing agent is cured and high pressure pumping instrument 410 is attached firmly to chemical solution pumping hole 401, high pressure pumping of adhesive is begun. In Step 4, high pressure pumping of adhesive is done from the lowest chemical solution pumping hole 401 when pumping begins from chemical solution pumping hole 401 is located in line BB in FIG. 19. A pump to be used for adhesive pumping must be high pressure type, namely high pressure pump 9 is used. At pumping pressure of maximum 7–15 MP, for instance, 500–1000 cc of adhesive of this type (3–300 thousand CP) is pumped within several seconds to 10 and several seconds from one hole. By high pressure pumping there is an effect of filling unfilled portion of cement, a gap or a crack existing inside the brick wall at fast speed and to the deep portion as well. Besides, it permeates inside the brick itself and adhesive oozes out from higher high pressure pumping instrument 410 when it is pumped from high pressure pumping instrument 410 below the former.

In Step 6 adhesive pumping for said high pumping instrument 410 is finished and nipple member 414 is screwed into high pressure pumping instrument 410 from which adhesive oozes out and high pressure pumping pump 409 is connected. This step is implemented before or after Step 5. The job is done to the highest hole in line with line BB and when finished it is done for the next file.

When a certain period is lapsed, a portion of high pressure pumping instrument 410 outside of chemical solution pumping hole 401, namely a portion of nipple member 414 is broken by a hammer. On the other hand main body of high pressure pumping instrument 410 is left inside chemical solution pumping hole 401 and plays a role of anchor.

Chemical solution pumping hole 401 can be closed with a cap or putty. Besides, when mortar is applied on the surface, a net for mortar application is attached to and around nipple member 414 rather than breaking nipple member 414 with a hammer.

Figure 23:
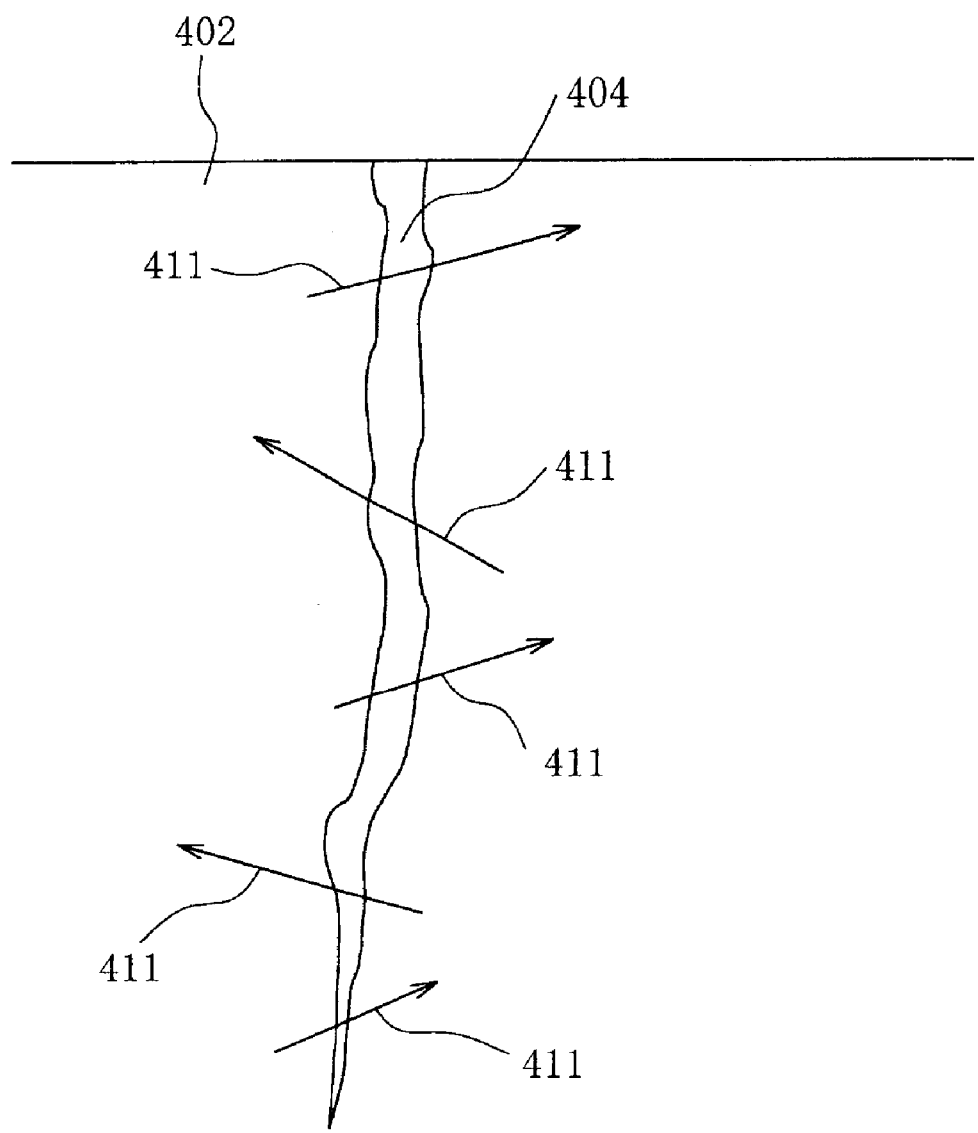
FIG. 23 is a schematic view explaining the high pressure pumping method for a fragile structure when a gap generated in the fragile structure leads to a crack or a cleft of the surface thereof.

FIG. 23 is a schematic view which explains high pressure pumping method for fragile structures for a crack generated inside the structure which leads to the surface of the structure.

Figure 24:
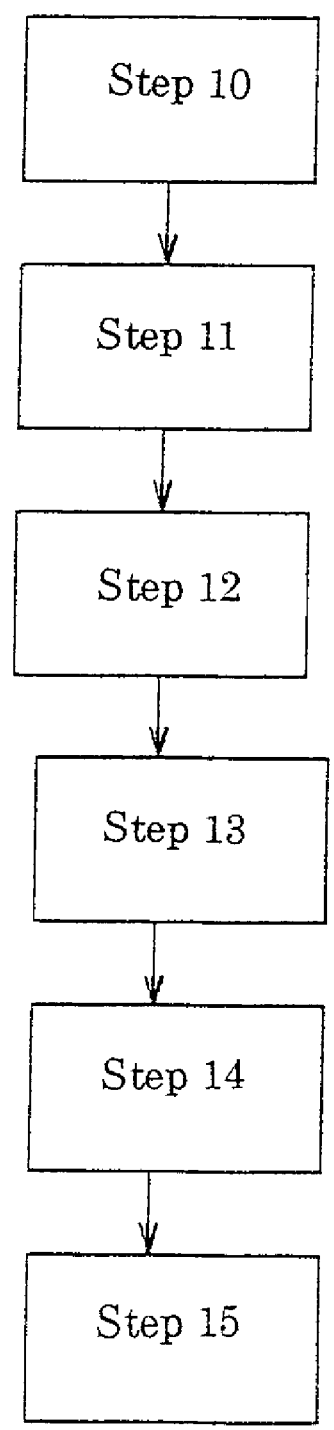
FIG. 24 is a flow chart of an another embodiment of the high pressure pumping method according to the eighth aspect of the present invention.

FIG. 24 is a flow chart of another embodiment of high pressure pumping method for fragile structure of the present invention.

When a gap generated inside the fragile structure leads to a crack 404 on the surface of fragile structure 402, chemical solution pumping hole is made from on one side of the crack to inside of the other side through said gap and the next chemical solution pumping hole is made from the other side to inside of one side in a cross manner. (Step 10)

In the same method in the first embodiment, high pressure pumping instrument 410 without nipple member is inserted into chemical solution pumping hole 401. (Step 11) Further, in Step 12 fixing agent is pumped between chemical solution pumping hole 401 and high pressure pumping instrument 410 continuously using pumping pump with a small nozzle.

In Step 13 when fixing agent is cured and high pressure pumping instrument 410 is fixed tightly to chemical solution pumping hole 401, adhesive is pumped into high pressure pumping instrument 410. When adhesive oozes out from high pressure pumping instrument 410 neighboring to high pressure pumping instrument 410 which is being pumped, adhesive pumping is completed for said chemical solution pumping hole. (Step 14) Then, nipple member 414 is attached to neighboring high pressure pumping instrument 410 from which adhesive oozes out and high pressure pump 409 is connected to pump adhesive. (Step 15) This action is continued until adhesive is pumped for all high pressure pumping instruments 410.

Next, using FIG. 25 funnel for fixing agent related with the third characteristic of the present invention is explained in details.

Figure 25A:
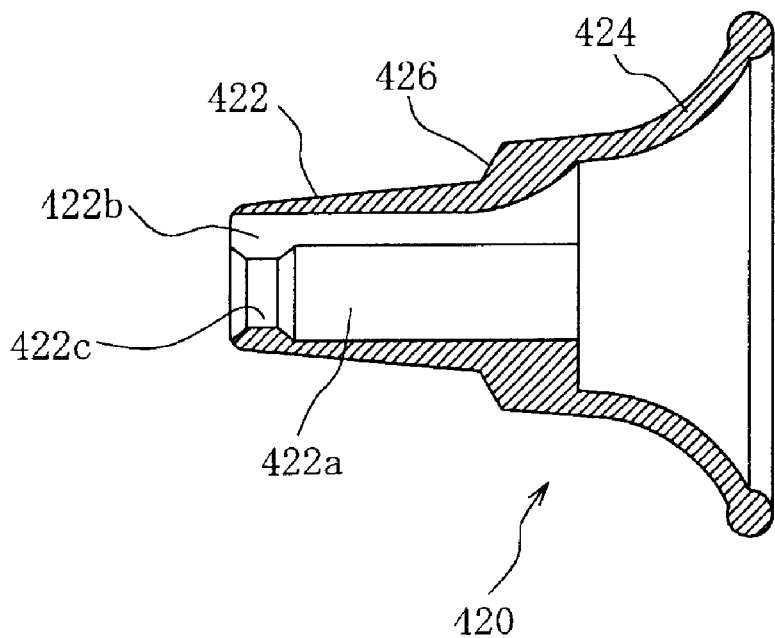
FIGS. 25A and 25B are longitudinal cross section views and its left side view each showing an embodiment of a funnel for a chemical fixing agent according to the ninth aspect of the present invention.
Figure 25B:
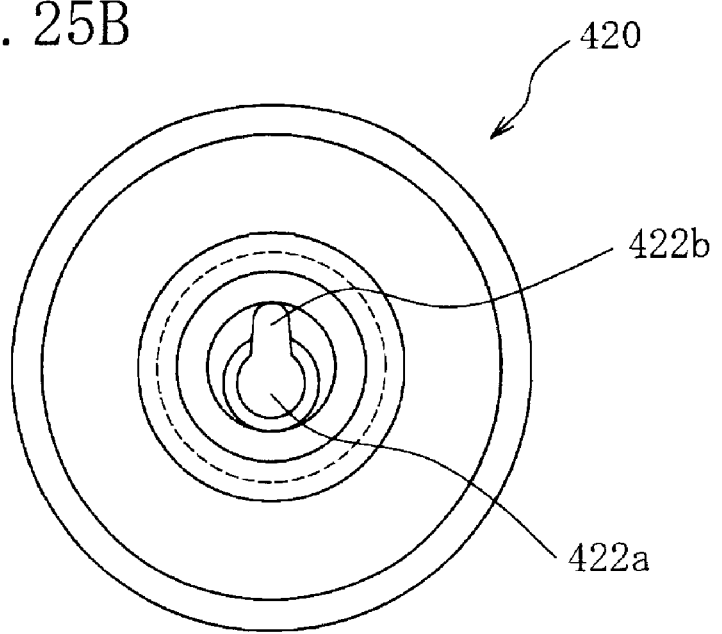

FIGS. 25A and 25B are a vertical cross section and its left side view of funnel for fixing agent of one embodiment according to the present invention.

As shown, funnel 420 for fixing agent according to the present invention comprises hole sealing plug 422 of an almost cylindrical shape and skirt shape member 424 which is made as one body with hole sealing plug 422. Preferably it is made of elastic rubber or flexible plastic. Hole sealing plug 422 has hole 422a to which pipe member 412 of said high pressure pumping instrument 410 is inserted and guide recess 422b to which small nozzle of pumping pump 407 for fixing agent is attached next to pumping hole 422a.

In a preferred embodiment shown, on the outside surface of the connecting portion of hole sealing plug 422 and skirt shape member 424 STOPPING MEMBER 426 is made next to the mouth of chemical solution pumping hole 401. Further, at the lower end of pumping hole 422a of hole sealing plug 422 protrusion 422c exists for setting the location where structurally weak member 412c of pipe member 412 of high pressure pumping instrument 410 is mounted. Funnel 420 is mounted to high pressure pumping instrument 410 with protrusion 422c attached to structurally weak member 412c made in pipe member 412.

Accordingly by determining the distance from protrusion 422c to STOPPING MEMBER 426 properly, the insertion place of high pressure pumping instrument 410 to chemical solution pumping hole 401 is simply and precisely controlled. In other words by inserting until STOPPING MEMBER 426 of funnel 420 reaches the mouth of chemical solution pumping hole 401, structurally weak member 412c of high pressure pumping instrument 410 is automatically and properly located at breaking point. Further, high pressure pumping instrument 410 itself is properly located inside chemical solution pumping hole 401. In addition in case funnel 420 is made of elastic material or flexible material, chemical solution pumping hole 401 can be sealed and pollution of wall with fixing agent is prevented almost completely.

Figure 26:
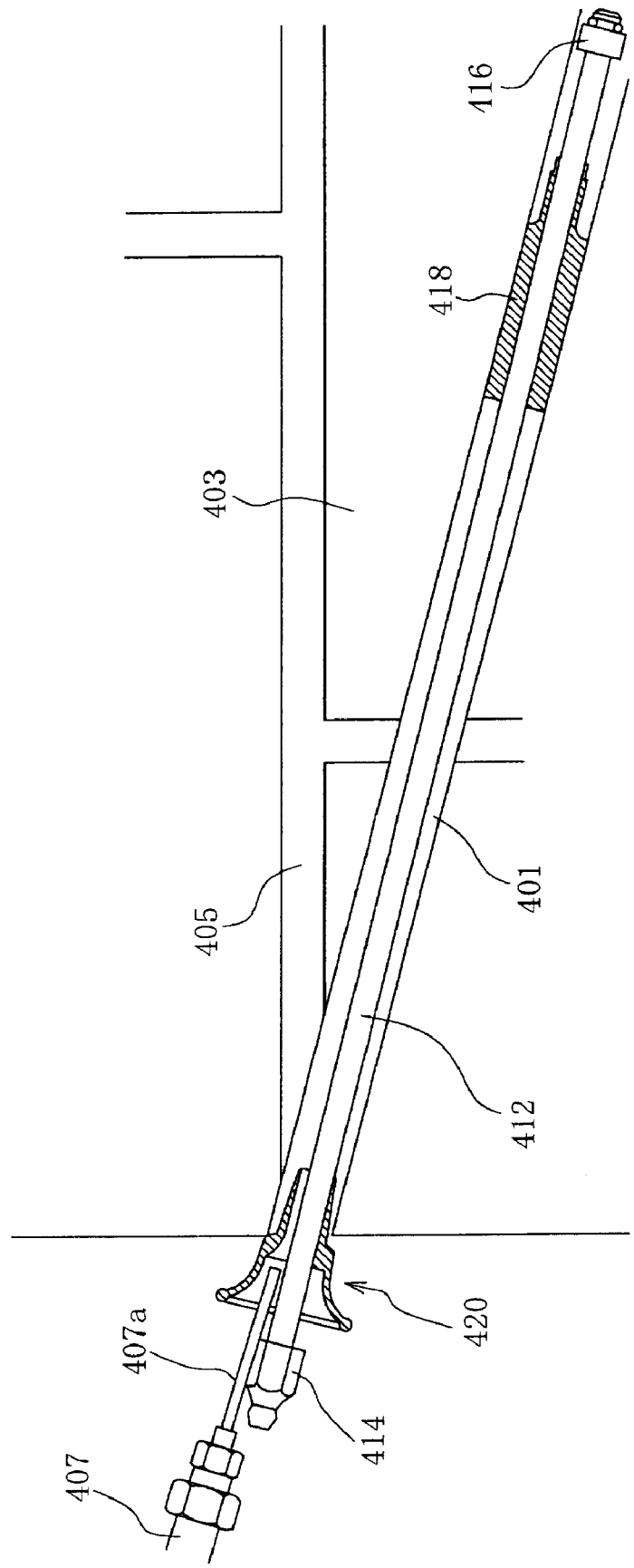
FIG. 26 is a cross section view showing the status when the funnel shown in FIG. 25 is mounted to the high pressure pumping instrument and is inserted to a hole for chemical solution pumping.

FIG. 26 is a cross section showing the status funnel is mounted to high pressure pumping instrument shown in FIG. 25 and inserted to chemical solution pumping hole.

As shown in figure, when inserting high pressure pumping instrument 410 to chemical solution pumping hole 401 on fragile structure 402, funnel 420 is mounted with nipple member 414 or 415 removed. In this case funnel 420 is mounted to high pressure pumping instrument 410 with protrusion 422c attaching to structurally weak member 412c on pipe member 412. When said high pressure pumping instrument 410 is inserted to chemical solution pumping hole 401, it stops when STOPPING MEMBER 426 of funnel 420 touches the mouth of chemical solution pumping hole 401.

Small nozzle of pumping pump 407 is inserted to guide recess 422b of funnel 420 and fixing agent is pumped between high pressure pumping instrument 420 and chemical solution pumping hole 401. After appropriate time is passed and fixing agent is cured enough to fix high pumping instrument 410 to chemical solution pumping hole 401, adhesive is pumped to high pressure pumping instrument 410 with high pressure pump 409. As mentioned in the above, in case high pressure pumping instrument 410 is inserted to chemical solution pumping hole 401 with nipple member 414 or 415 mounted or if not mounted, it has to be mounted and using high pressure pump 409 adhesive is pumped at high pressure. After appropriate time is passed and adhesive is cured, head of high pressure pumping instrument 410 is beaten with a hammer, etc. A portion on the side of nipple member 414 or 415 of high pressure pumping instrument 410 protruded from fragile structure 402 is broken and falls off.

When funnel 420 of the present invention is used, spilled chemical during pumping is collected with skirt shape member 424 and wall is not polluted.

It takes 2–3 time period of pumping time to scrape off adhesive from and wash the wall under a conventional method, however, according to the present invention this type of job is not necessary any longer.

In accordance with the present invention since high pressure pumping instrument for fragile structure is provided which is characterized as comprising long and slender pipe member, having center hole for chemicals, of smaller outside diameter than inside diameter of chemical solution pumping hole, nipple member, at the center of which hole is made and to which chemical solution pump is connected fluidwise, non-return bias mechanism to prevent back flow of chemicals pumped inside chemical solution pumping hole through center hole of said pipe member which is installed inside of nipple member or installed as a separate part on the other end of center hole of pipe member and sealing member for fixing agent which is installed on the middle of the periphery of pipe member and has larger diameter than inside diameter of chemical solution pumping hole, which can yet to be adjusted to have smaller diameter and high pressure pumping instrument for fragile structure is provided to enable resin filling and installation of anchor.

What is claimed is:

1. A non-return bias valve mechanism for a fluid pumping assembly established to prevent backflow of fluid when the fluid is pumped under pressure, said mechanism comprising:
   a body member having a longitudinal hole formed therein extending along an axis direction of the body member and a radial hole extending from the longitudinal hole in a radial direction to the axis direction and going through the body member to an outside surface thereof, said outside surface of the body member being formed with a recess which lies in the same plane as the radial hole,
   a ring shaped sealing member made of material having elasticity such as of rubber which is seated in said recess and is expandable such that it seals the radial hole of the body member when no fluid is pumped under pressure and deforms to unseal the radial hole when fluid is pumped under pressure, wherein said ring shaped sealing member and said recess have cross-sectional profiles complementary to each other so as to have surface contact between them when the ring shaped sealing member seals the radial hole, thereby obtaining an almost perfect seal even if the fluid contains filler materials which migh obstruct a line contact seal.

2. A non-return bias valve mechanism for a fluid pumping assembly mentioned in claim 1 being characterized in that said ring shaped sealing member comprises an O-ring having a round shape in cross section, and said recess is formed with a semi-circular shape in cross section to which said O-ring fits.

3. A non-return bias valve mechanism for a fluid pumping assembly mentioned in claim 1 being characterized in that said ring shaped sealing member comprises an O-ring having a square shape in cross section, and said recess is formed with a square shape in cross section to which said O-ring fits.

4. A non-return bias valve mechanism for a fluid pumping assembly mentioned in claim 1 being characterized in that more than one radial holes are formed in the valve body member.

5. A non-return bias valve mechanism for a fluid pumping assembly mentioned in claim 1 being characterized in that said outside surface of said body member has a circular cross section except for a cut-out segment where the radial hole extends to the outside surface and thereby defines a fluid flowing route that goes through from the position of the radial hole to the outside surface of said body member.

* * * * *